(12) United States Patent
Anderson, Jr. et al.

(10) Patent No.: US 10,584,510 B2
(45) Date of Patent: Mar. 10, 2020

(54) FLOOD VENT HAVING A PANEL

(71) Applicant: Smart Vent Products, Inc., Juno Beach, FL (US)

(72) Inventors: Winfield Scott Anderson, Jr., Palm Beach Gardens, FL (US); Tom Little, Pitman, NJ (US); Michael J. Graham, Pitman, NJ (US)

(73) Assignee: SMART VENT PRODUCTS, INC., Juno Beach, FL (US)

( * ) Notice: Subject to any disclaimer, the term of this patent is extended or adjusted under 35 U.S.C. 154(b) by 0 days.

(21) Appl. No.: 16/230,633

(22) Filed: Dec. 21, 2018

(65) Prior Publication Data

US 2019/0128006 A1    May 2, 2019

Related U.S. Application Data

(60) Division of application No. 15/665,145, filed on Jul. 31, 2017, now Pat. No. 10,161,156, which is a continuation of application No. 14/965,337, filed on Dec. 10, 2015, now Pat. No. 9,758,982.

(51) Int. Cl.
| | |
|---|---|
| *E04H 9/14* | (2006.01) |
| *E04B 1/92* | (2006.01) |
| *E06B 9/00* | (2006.01) |

(52) U.S. Cl.
CPC .............. *E04H 9/145* (2013.01); *E04B 1/92* (2013.01); *E06B 9/00* (2013.01); *E06B 2009/007* (2013.01)

(58) Field of Classification Search
None
See application file for complete search history.

(56) References Cited

U.S. PATENT DOCUMENTS

| 73,159 A | 1/1868 | Besse |
|---|---|---|
| 100,623 A | 3/1870 | Hays |
| 314,865 A | 3/1885 | Monger |

(Continued)

FOREIGN PATENT DOCUMENTS

| AU | 2008100183 | 5/2008 |
|---|---|---|
| DE | 1659275 | 3/1971 |

(Continued)

OTHER PUBLICATIONS

Smart Vent, web pages from www.smartvent.com, printed Apr. 6, 2015.

(Continued)

*Primary Examiner* — Brian E Glessner
*Assistant Examiner* — Adam G Barlow
(74) *Attorney, Agent, or Firm* — Akerman LLP

(57) ABSTRACT

According to one embodiment, a flood vent panel includes a first area, a second area, and a first set of one or more perforations positioned on a first side of the flood vent panel in a location in-between the first area and the second area. The perforations are configured to break when at least a predetermined amount of pressure is applied to a portion of the second area. The flood vent panel is configured to be coupled, at least indirectly, to a structure so as to at least partially block a fluid passageway through an opening in the structure. The break is configured to completely separate the second area from the first area so as to reduce an amount of blockage of the fluid passageway.

11 Claims, 9 Drawing Sheets

(56) References Cited

U.S. PATENT DOCUMENTS

| | | | |
|---|---|---|---|
| 735,053 A | 8/1903 | Bates | |
| 850,441 A | 4/1907 | McGinnis | |
| 911,290 A | 2/1909 | Burkett | |
| 1,089,232 A | 3/1914 | Larson | |
| 2,105,735 A | 1/1938 | Hodge | |
| 2,118,535 A | 5/1938 | Betts | |
| 2,565,122 A | 8/1951 | Cowan | |
| 2,611,310 A | 9/1952 | Cowan | |
| 2,774,116 A | 12/1956 | Wolverton | |
| 2,798,422 A | 7/1957 | Bourque | |
| 2,834,278 A * | 5/1958 | Crute, Jr. | E04B 1/7076 454/276 |
| 3,123,867 A | 3/1964 | Combs | |
| 3,425,175 A | 2/1969 | Gerde | |
| 3,680,329 A | 8/1972 | Burtis | |
| 3,683,630 A | 8/1972 | Alexandre | |
| 3,927,709 A | 12/1975 | Anderson et al. | |
| 3,939,863 A | 2/1976 | Robison | |
| 3,942,328 A | 3/1976 | Bunger | |
| 3,974,654 A | 8/1976 | Mirto et al. | |
| 3,978,616 A | 9/1976 | Pennock | |
| 4,048,771 A | 9/1977 | Thistlewaite | |
| 4,116,213 A | 9/1978 | Kamezaki | |
| 4,146,346 A | 3/1979 | Salo | |
| 4,148,857 A | 4/1979 | Wheeler | |
| 4,174,913 A | 11/1979 | Schliesser | |
| 4,227,266 A | 10/1980 | Russell | |
| 4,231,412 A | 11/1980 | Nowak | |
| 4,290,635 A | 9/1981 | McKenzie | |
| 4,349,296 A | 9/1982 | Langeman | |
| 4,378,043 A | 3/1983 | Sorenson | |
| 4,549,837 A | 10/1985 | Hebert | |
| 4,576,512 A | 3/1986 | Combes et al. | |
| 4,606,672 A | 8/1986 | LeSire | |
| 4,612,739 A * | 9/1986 | Wilson | B65D 90/36 137/68.23 |
| 4,669,371 A | 6/1987 | Sarazen, Jr. et al. | |
| 4,676,145 A | 6/1987 | Allred | |
| 4,699,045 A | 10/1987 | Hensley | |
| 4,754,696 A | 7/1988 | Sarazen et al. | |
| 4,821,909 A * | 4/1989 | Hibler | B65D 90/36 220/203.08 |
| 5,036,632 A * | 8/1991 | Short, III | B65D 90/36 52/1 |
| 5,171,102 A | 12/1992 | De Wit | |
| 5,253,804 A | 10/1993 | Sarazen et al. | |
| 5,293,820 A | 3/1994 | Vagedes | |
| 5,294,049 A | 3/1994 | Trunkle et al. | |
| 5,330,386 A | 7/1994 | Calandra | |
| 5,408,789 A | 4/1995 | Plfeger | |
| 5,460,572 A | 10/1995 | Waltz et al. | |
| 5,487,701 A | 1/1996 | Schnedegger et al. | |
| 5,904,199 A | 5/1999 | Messner | |
| 5,944,445 A * | 8/1999 | Montgomery | E04B 1/7076 405/92 |
| 5,994,445 A | 11/1999 | Kaschel et al. | |
| 6,092,580 A | 7/2000 | Lucas | |
| 6,287,050 B1 | 9/2001 | Montgomery et al. | |
| 6,485,231 B2 * | 11/2002 | Montgomery | E02B 7/40 405/92 |
| 6,692,187 B2 | 2/2004 | Sprengle | |
| 6,817,942 B1 * | 11/2004 | Betz | E04B 1/7076 454/271 |
| 7,128,643 B2 | 10/2006 | Beliveau | |
| 7,234,278 B2 * | 6/2007 | Eijkelenberg | B65D 90/36 220/89.1 |
| 7,600,944 B1 | 10/2009 | Keating | |
| 8,308,396 B2 | 11/2012 | Shook | |
| 8,375,664 B2 * | 2/2013 | Gower, Sr. | E04B 1/7076 52/169.5 |
| 8,511,938 B1 * | 8/2013 | Payne | E04B 1/7076 160/123 |
| 9,353,569 B1 | 5/2016 | Anderson, Jr. et al. | |
| 9,376,803 B1 | 6/2016 | Anderson, Jr. | |
| 9,637,912 B1 | 5/2017 | Anderson, Jr. et al. | |
| 9,719,249 B2 | 8/2017 | Anderson, Jr. et al. | |
| 10,017,937 B2 | 7/2018 | Anderson, Jr. et al. | |
| 10,161,156 B2 | 12/2018 | Anderson, Jr. et al. | |
| 2002/0021941 A1 * | 2/2002 | Montgomery | E02B 7/40 405/100 |
| 2005/0204664 A1 * | 9/2005 | Snyder | E04F 17/04 52/302.1 |
| 2008/0127591 A1 | 6/2008 | Tucci | |
| 2008/0184625 A1 | 8/2008 | Bjorholm | |
| 2008/0236062 A1 | 10/2008 | Bergaglio | |
| 2009/0239462 A1 * | 9/2009 | Hendricks | F24F 13/084 454/271 |
| 2011/0182669 A1 * | 7/2011 | Shook | E04B 1/7076 405/104 |
| 2012/0174501 A1 | 7/2012 | Malitsky | |
| 2012/0266975 A1 | 10/2012 | Kelly | |
| 2013/0269271 A1 * | 10/2013 | Webb | E06B 9/02 52/202 |
| 2013/0279986 A1 * | 10/2013 | Payne | E04B 1/70 405/98 |
| 2014/0109993 A1 | 4/2014 | Kelly | |
| 2017/0167132 A1 | 6/2017 | Anderson et al. | |
| 2017/0167156 A1 | 6/2017 | Anderson et al. | |
| 2017/0234001 A1 | 8/2017 | Anderson, Jr. et al. | |
| 2017/0260739 A1 | 9/2017 | Anderson et al. | |
| 2018/0038161 A1 | 2/2018 | Anderson, Jr. et al. | |

FOREIGN PATENT DOCUMENTS

| | | |
|---|---|---|
| EP | 2273056 | 1/2011 |
| EP | 2290188 | 3/2011 |
| EP | 2365134 | 9/2011 |
| EP | 2374981 | 10/2011 |
| EP | 2458092 | 5/2012 |
| EP | 2764192 | 4/2013 |
| EP | 2634328 | 9/2013 |
| EP | 2647888 | 10/2013 |
| EP | 2662512 | 11/2013 |
| EP | 2682687 | 1/2014 |
| GB | 1203527 | 8/1970 |
| GB | 2147933 | 5/1985 |
| GB | 2342948 | 12/1999 |
| GB | 2397592 | 7/2004 |
| GB | 2461754 | 1/2010 |
| GB | 2466302 | 6/2010 |
| GB | 2498330 | 7/2013 |
| JP | 55-085720 | 6/1980 |
| JP | 04-203112 | 7/1992 |
| WO | 2015051352 | 4/2015 |

OTHER PUBLICATIONS

Smart Vent, product literature "Smart Vent Foundation Flood Vents vs. Flood Flaps" printed Apr. 6, 2015.

Smart Vent, product literature "Family of Products" printed Apr. 6, 2015.

FEMA, Openings in Foundation Walls and Walls of Enclosures, Technical Bulletin, Aug. 1, 2008.

FEMA, Non-Residential Floodproofing, Technical Bulletin, Apr. 3, 1993.

Smart Vent, "Foundation Flood Vents" printed Apr. 6, 2015.

Smart Vent, Product Catalog printed Apr. 6, 2015.

Declaration of Michael J. Graham dated Nov. 7, 2016.

Search and Examination Report issued in GB1621003.1, dated Feb. 23, 2017.

Homosote Company, Safety Data Sheet for Medium Density Fiber Board (Cellulse Based), issued May 19, 2015.

Center for Applied Engineering, Inc., Fire Testing Laboratory Report for 440 Homasote provided to Homasote Company, West Trenton, NJ, Project No. 257164, May 17, 1995.

\* cited by examiner

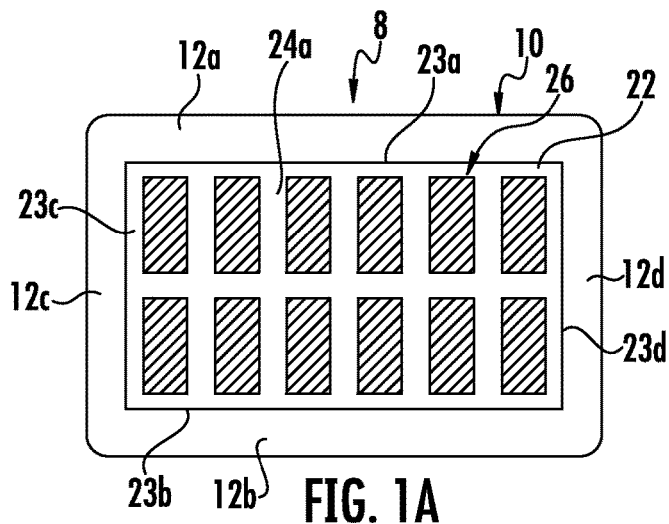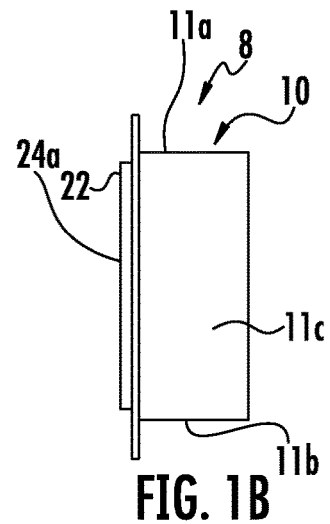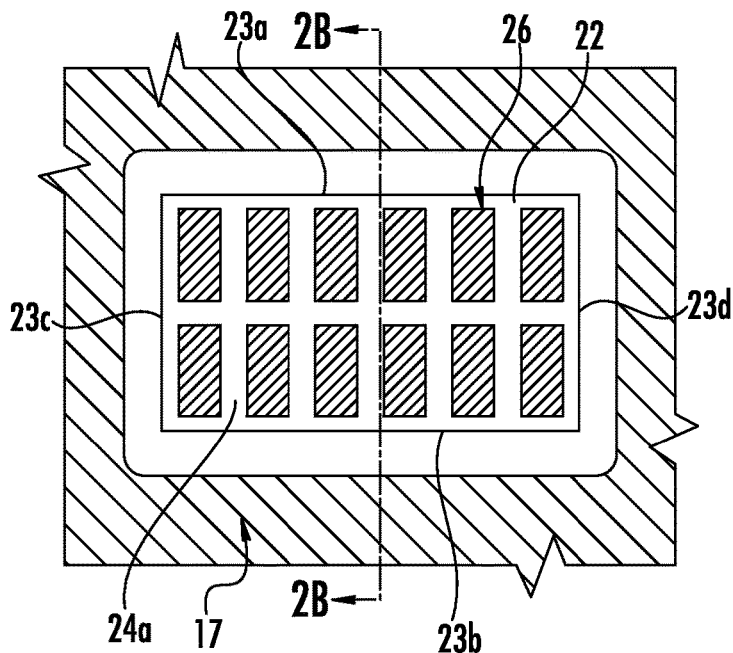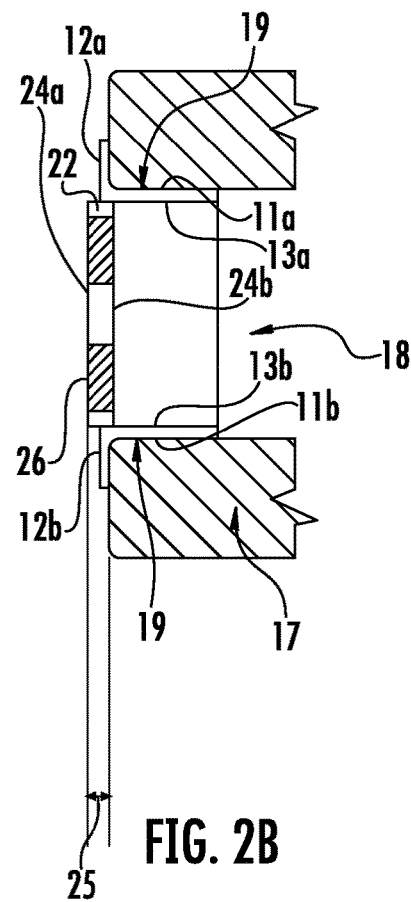

FLOOD VENT HAVING A PANEL

CROSS REFERENCE TO RELATED APPLICATIONS

This application is a divisional of U.S. patent application Ser. No. 15/665,145, filed Jul. 31, 2017, which is a continuation of and claims the benefit of the filing date under 35 U.S.C. § 120 of U.S. patent application Ser. No. 14/965,337, filed on Dec. 10, 2015 (which issued into U.S. Pat. No. 9,758,982 on Sep. 12, 2017), the contents of both of which are hereby incorporated by reference in their entirety.

TECHNICAL FIELD

This disclosure relates generally to flood water control devices and more particularly to a flood vent having a panel.

BACKGROUND

Typically, one or more flood vents may be installed into an opening in a structure (such as a building) in order to provide for equalization of interior and exterior hydrostatic forces caused by flooding fluids, such as water. Such typical flood vents may include a screen or grille that may allow flooding fluids to pass into or out of the structure through the flood vent, but that may prevent animals or other pests from entering or exiting the structure through the flood vent. These typical flood vents, however, may be deficient.

SUMMARY

According to one embodiment, a flood vent includes a frame configured to form a fluid passageway through an opening in a structure. The flood vent further includes a panel configured to be coupled to the frame in the fluid passageway so as to at least partially block the fluid passageway through the opening in the structure. The flood vent also includes one or more connectors configured to couple the panel to the frame. The one or more connectors are further configured to uncouple the panel from the frame when 0.5-5.0 pounds per square inch (PSI) of pressure is applied to a portion of the panel by one or more of a fluid or an object carried by the fluid, so as to reduce an amount of blockage of the fluid passageway provided by the panel.

Certain embodiments of the disclosure may provide one or more technical advantages. For example, the flood vent includes one or more connectors configured to uncouple the panel from the frame when a predetermined amount of pressure is applied to the panel, such as by a fluid or an object (such as a tree limb or dirt) carried by the fluid. As such, in particular embodiments, the panel of the flood vent may prevent (or substantially prevent) objects and/or fluids from passing through the flood vent until a predetermined amount of pressure is applied to the panel, and after the predetermined amount of pressure is applied to the panel, the panel may be uncoupled from the flood vent and may no longer prevent objects and/or fluids from passing through the flood vent (or the amount of blockage of the fluid passageway provided by the panel may be reduced). This may, in particular embodiments, allow the flood vent to provide for equalization of hydrostatic forces caused by, for example, flooding fluids, even when the flooding fluids carry objects (such as debris) that may clog the openings in the panel, when the openings in the panel are too small to allow sufficient fluids to pass through the flood vent, when the openings in the panel are closed, and/or when the panel does not include any openings.

According to another embodiment, a flood vent includes a frame configured to form a fluid passageway through an opening in a structure. The flood vent further includes a panel configured to be coupled to the frame in the fluid passageway so as to at least partially block the fluid passageway through the opening in the structure. The flood vent also includes one or more connectors configured to couple the frame to the structure. The one or more connectors are further configured to uncouple the frame from the structure when 0.5-5.0 PSI of pressure is applied to one or more of a portion of the panel or a portion of the frame by one or more of a fluid or an object carried by the fluid, so as to reduce an amount of blockage of the fluid passageway.

Certain embodiments of the disclosure may provide one or more technical advantages. For example, the flood vent includes one or more connectors configured to uncouple the frame from the structure when a predetermined amount of pressure is applied to the panel and/or the frame, such as by a fluid or an object (such as a tree limb or dirt) carried by the fluid. As such, in particular embodiments, the panel of the flood vent may prevent (or substantially prevent) objects and/or fluids from passing through the flood vent until a predetermined amount of pressure is applied to the panel and/or the frame, and after the predetermined amount of pressure is applied to the panel and/or the frame, the frame (along with the panel) may be uncoupled from the structure and the panel may no longer prevent objects and/or fluids from passing through the opening in the structure (or the amount of blockage of the fluid passing through the opening may be reduced). This may, in particular embodiments, allow the flood vent to provide for equalization of hydrostatic forces caused by, for example, flooding fluids, even when the flooding fluids carry objects (such as debris) that may clog the openings in the panel, when the openings in the panel are too small to allow sufficient fluids to pass through the flood vent, when the openings in the panel are closed, and/or when the panel does not include any openings.

According to a further embodiment, a flood vent panel includes a first area, a second area, and a first set of one or more perforations positioned on a first side of the flood vent panel in a location in-between the first area and the second area of the flood vent panel. The first set of one or more perforations are configured to break when at least a predetermined amount of pressure is applied to a portion of the second area of the flood vent panel. The flood vent panel is configured to be coupled, at least indirectly, to a structure so as to at least partially block a fluid passageway through an opening in the structure. The break is configured to completely separate the second area of the flood vent panel from the first area of the flood vent panel so as to reduce an amount of blockage of the fluid passageway provided by the flood vent panel.

Certain embodiments of the disclosure may provide one or more technical advantages. For example, the flood vent includes one or more perforations configured to uncouple at least a portion of the panel from the flood vent when a predetermined amount of pressure is applied to the panel, such as by a fluid or an object (such as a tree limb or dirt) carried by the fluid. As such, in particular embodiments, the panel of the flood vent may prevent (or substantially prevent) objects and/or fluids from passing through the flood vent until a predetermined amount of pressure is applied to the panel, and after the predetermined amount of pressure is applied to the panel, the at least a portion of the panel may be uncoupled from the flood vent and may no longer prevent objects and/or fluids from passing through the flood vent (or the amount of blockage of the fluid passageway provided by the panel may be reduced). This may, in particular embodiments, allow the flood vent to provide for equalization of hydrostatic forces caused by, for example, flooding fluids, even when the flooding fluids carry objects (such as debris) that may clog the openings in the panel, when the openings in the panel are too small to allow sufficient fluids to pass through the flood vent, when the openings in the panel are closed, and/or when the panel does not include any openings.

According to a further embodiment, a flood vent panel includes a plurality of insulation pieces coupled together to form at least a portion of the flood vent panel. The flood vent panel further includes one or more insulation piece connectors coupled to the plurality of insulation pieces. The one or more insulation piece connectors are configured to couple the plurality of insulation pieces together to form the at least the portion of the panel. The flood vent panel is configured to be coupled, at least indirectly, to a structure, so as to at least partially block a fluid passageway through an opening in the structure. The one or more insulation piece connectors are further configured to uncouple one or more of the plurality of insulation pieces from the panel when at least a predetermined amount of pressure is applied to a portion of the flood vent panel by one or more of a fluid or an object carried by the fluid, so as to reduce an amount of blockage of the fluid passageway provided by the flood vent panel.

Certain embodiments of the disclosure may provide one or more technical advantages. For example, the flood vent includes a plurality of insulation pieces configured to form at least a portion of the panel, and one or more insulation piece connectors configured to uncouple one or more of the insulation pieces from the panel when a predetermined amount of pressure is applied to the panel, such as by a fluid or an object (such as a tree limb or dirt) carried by the fluid. As such, in particular embodiments, the panel of the flood vent may prevent (or substantially prevent) objects and/or fluids from passing through the flood vent until a predetermined amount of pressure is applied to the panel, and after the predetermined amount of pressure is applied to the panel, one or more of the insulation pieces of the panel may be uncoupled from the panel and may no longer prevent objects and/or fluids from passing through the flood vent (or the amount of blockage of the fluid passageway provided by the panel may be reduced). This may, in particular embodiments, allow the flood vent to provide for equalization of hydrostatic forces caused by, for example, flooding fluids, even when the flooding fluids carry objects (such as debris) that may clog the openings in the panel, when the openings in the panel are too small to allow sufficient fluids to pass through the flood vent, when the openings in the panel are closed, and/or when the panel does not include any openings.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE FIGURES

For a more complete understanding of the present disclosure and its features and advantages, reference is now made to the following description, taken in conjunction with the accompanying drawings, in which:

FIG. 1A illustrates a front view of a door of an example flood vent.

FIG. 1B illustrates a side view of the door of FIG. 1A.

FIG. 2A illustrates a front view of an example flood vent inserted into an opening of a structure.

FIG. 2B illustrates a cross-sectional view of an example flood vent inserted into an opening of a structure, taken along section line 2-2 of FIG. 2A.

DETAILED DESCRIPTION

Figure 2C:
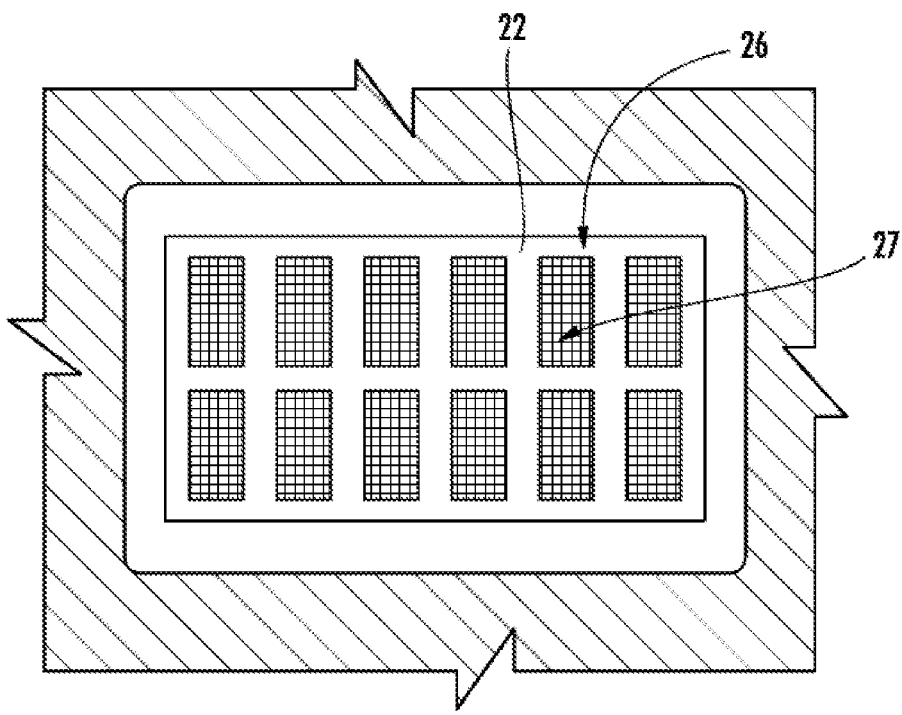
FIG. 2C illustrates a front view of another example flood vent inserted into an opening of a structure, where the panel of the flood vent includes a screen.

Embodiments of the present disclosure are best understood by referring to FIGS. 1-7 of the drawings, like numerals being used for like and corresponding parts of the various drawings.

FIGS. 1-2 illustrate an example of a flood vent 8. The flood vent 8 may be inserted (or otherwise installed) into an opening 18 in a structure 17, such as an opening in a building, a wall, a foundation, a basement, a garage, a garage door, a foyer, an entry, any structure located below base flood plain levels, any other structure, or any combination of the preceding. The flood vent 8 may provide an entry point and/or exit point in the structure for flooding fluids, such as water. As such, the flood vent 8 may provide equalization of interior and exterior hydrostatic forces caused by the flooding fluids. In particular embodiments, the flood vent 8 may comply with various building code and federal government regulations that mandate that buildings with enclosed spaces located below base flood plain levels, such as crawl spaces, must provide for automatic equalization of interior and exterior hydrostatic forces caused by flooding fluids. According to these regulations, flooding fluids must be permitted to enter and exit the enclosed spaces freely using flood venting.

As illustrated, the flood vent 8 includes a frame 10 and a panel 22. The frame 10 may be configured to be inserted into an opening 18 in a structure 17, and may be further configured to form a fluid passageway through the opening 18 in the structure 17, thereby allowing fluids to enter and/or exit the structure 17. The frame 10 includes a top edge 11a, a bottom edge 11b, and two side edges 11c and 11d (not shown). The edges 11 may define an outer perimeter of the frame 10. The frame 10 further includes a top rail 12a, a bottom rail 12b, and two side rails 12c and 12d. When the flood vent 8 is inserted (or otherwise installed) in the opening 18 in the structure 17, the edges 11 of the frame 10 may be positioned (entirely or partially) within the opening 18 of the structure 17 (as is seen in FIG. 2B), and the rails 12 may be positioned (entirely or partially) outside the opening 18 of the structure 17 (as is further seen in FIG. 2B). The frame 10 also includes a top interior edge 13a, a bottom interior edge 13b, and two side interior edges 13c and 13d (not shown). The interior edges 13 of the frame 10 may define an inner perimeter of the frame 10. Furthermore, although the flood vent 8 is illustrated as including a single frame 10 and a single panel 22, the flood vent 8 may include multiple frames 10 and/or multiple panels 22. For example, the flood vent 8 may include two frames 10 (or two or more frames 10) stacked on top of each other (and coupled together), along with one or more panels 22 attached to each frame 10 (or a single panel 22 attached to multiple frames 10). As another example, the flood vent 8 may include two frames 10 (or two or more frames 10) positioned horizontally next to each other (and coupled together), along with one or more panels 22 attached to each frame 10 (or a single panel 22 attached to multiple frames 10). As a further example, the flood vent 8 may include two frames 10 (or two or more frames 10) stacked on top of each other and two frames 10 (or two or more frames 10) positioned horizontally next to each other (and these four or more frames 10 may be coupled together), along with one or more panels 22 attached to each frame 10 (or a single panel 22 attached to multiple frames 10).

The frame 10 may have any shape. For example, the frame 10 may be rectangular-shaped. The frame 10 may also have any dimensions. For example, the top and bottom edges 11a and 11b may be approximately 16" long (16"+/− 0.2"), and the side edges 11c and 11d may be approximately 8" long, thereby forming an 8"×16" rectangular outer perimeter. Furthermore, the top and bottom rails 12a and 12b may be approximately 17¹¹⁄₁₆" long, and the side rails 12c and 12d may be approximately 9¹¹⁄₁₆" long. Additionally, when two or more frames 10 are coupled together (as is discussed above), the flood vent 8 may have an outer perimeter of, for example, approximately 16"×16", 8"×32", 16"×32", or any other dimensions. The frame 10 may be formed (or made) of any material. For example, the frame 10 may be formed of a corrosion resistant material, such as stainless steel, spring steel, plastic, a polymer, cement, brick, any other corrosion resistant material, or any combination of the preceding.

The frame 10 may be configured to be inserted (or otherwise installed) into an opening 18 in any side of the structure 17. For example, the opening 18 in the structure 17 may extend from the exterior of the structure 17 to the interior of the structure 17 (such as the interior of a building), thereby allowing fluids to enter and/or exit the structure 17. The frame 10 of the air vent 8 may be inserted (or otherwise installed) on the exterior side of the structure 17 (for an exterior frame 10 for an exterior flood vent 8, for example) or on the interior side of the structure 17 (for an interior frame 10 for an interior flood vent 8, for example). As illustrated in FIGS. 1-2, frame 10 is inserted on the exterior side of the structure 17. Furthermore, frames 10 may be inserted (or otherwise installed) on both the exterior side of the structure 17 (for exterior frames 10, for example) and the interior side of the structure 17 (for interior frames 10, for example). Additionally, in particular embodiments, a sleeve may be positioned in-between an interior frame 10 and an exterior frame 10. The sleeve may be configured to connect to the exterior frame 10 at a first end of the sleeve, extend through the opening 18 in the structure 17 to the interior frame 10, and connect to the interior frame 10 at a second end of the sleeve. The sleeve may form a portion of the fluid passageway through the opening 18 in the structure 17. For example, fluid such as water may enter the opening 18 in the structure 17 through exterior flood vent 8, flow through the sleeve, and exit the opening 18 into the interior of the structure 17 (or vice versa). The sleeve may have any shape. For example, the sleeve may be a hollow rectangular sleeve. The sleeve may have any dimensions. For example, the sleeve may be sized to fit entirely within the opening 18, connecting the exterior frame 10 to the interior frame 10. The sleeve may be formed (or made) of any material. For example, the sleeve may be formed of a corrosion resistant material, such as stainless steel, spring steel, plastic, a polymer, cement, brick, any other corrosion resistant material, or any combination of the preceding.

The flood vent 8 further includes a panel 22. The panel 22 may be configured to be coupled to the frame 10 (thereby coupling the panel 22 to the structure 17 indirectly). The panel 22 may be coupled to the frame 10 in any manner. For example, the panel 22 may be formed integral with the frame 10, welded to the frame 10, coupled to the frame 10 using an adhesive (such as glue, cement, and/or Lexel®), attached to the frame 10 using one or more pins that may be inserted or snapped into one or more channels or hooks in the frame 10, attached to the frame 10 using one or more rivets, nails, and/or any other connector, attached to the structure 17 (and thus the frame 10) using one or more rivets, nails, and/or any other connecter, coupled to the frame 10 in any other manner, or any combination of the preceding. The panel 22 may be configured to be coupled to the frame 10 in the fluid passageway formed by the frame 10. Additionally, when coupled to the frame 10, the panel 22 may at least partially block the fluid passageway formed by the frame 10, an example of which is seen in FIGS. 2A-2B. The panel 22 may block any portion of the fluid passageway formed by the frame 10. For example, the panel 22 may block all of the fluid passageway (or completely block the fluid passageway) formed by the frame 10, thereby preventing all (or substantially all) fluids (such as water and/or air) from passing through the panel 22, as well as preventing objects (such as small animals) from passing through the panel 22. As another example, the panel may block only a portion of the fluid passageway, thereby preventing (or substantially preventing) objects (such as small animals) from passing through the panel 22, but allowing fluids (such as water and/or air) to pass through the panel 22.

The panel 22 may be any type of panel. For example, the panel 22 may include one or more openings 26 configured to allow fluids (such as water and/or air) to pass through the panel 22, but prevent objects (such as small animals) from passing through the panel 22. In such an example, the panel 22 may be a mesh grille panel, a grate, any other panel with one or more openings 26, or any combination of the preceding. The openings 26 may have any size and/or shape. In particular embodiments, the size of the openings 26 may be sufficiently small to prevent (or substantially prevent) objects, such as small animals, from passing through the panel 22. The panel 22 may include any number of openings 26, such as one opening 24, two openings 26, three openings 26, four openings 26, eight openings 26, ten openings 26, or any other number of openings 26. The openings 26 may be completely open, or the openings 26 may be screened to prevent (or substantially prevent) penetration by small animals and/or insects. An example of the panel 22 including a screen 27 is illustrated in FIG. 2C.

Figure 2D:
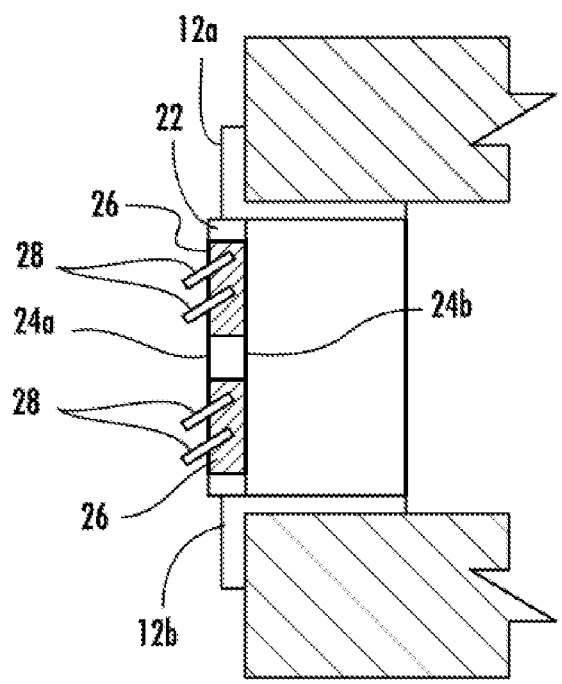
FIG. 2D illustrates a cross-sectional view of another example flood vent inserted into an opening of a structure, where the panel of the flood vent includes louvers.

As another example, the panel 22 may be a solid panel that may prevent all (or substantially all) fluids (such as water and/or air) from passing through the panel 22, as well as preventing (or substantially preventing) objects (such as small animals) from passing through the panel 22. As a further example, the panel 22 may be a screen (such as a fine mesh screen) configured to prevent (or substantially prevent) penetration by small animals and/or insects. As another example, the panel 22 may include one or more louvers (such as, for example, four louvers, or any other number of louvers) that may be opened to allow air to pass through the panel 22 (e.g., during warmer temperatures), and closed to prevent (or substantially prevent) air from passing through the panel 22 (e.g., during colder temperatures). Additionally, the louvered panel 22 may be screened to prevent (or substantially prevent) penetration by small animals and/or insects. Further details regarding louvers (and the operation of such louvers) is included in U.S. Pat. No. 6,692,187 entitled "Flood Gate For Door," which is incorporated herein by reference. An example of the panel 22 including louvers 28 is illustrated in FIG. 2D.

The panel 22 includes a top edge 23a, a bottom edge 23b, and two side edges 23c and 23d. The edges 23 may define an outer perimeter of the panel 22. The panel 22 further includes a first side 24a and a second side 24b positioned opposite of the first side 24a. As is illustrated, the first side 24a may be positioned to face the exterior of the structure 17, and the second side 24b may be positioned to face the interior of the structure 17. However, the first side 24a may face either the exterior of the structure 17 or the interior of the structure 17, and the second side 24b may face either the exterior of the structure 17 or the interior of the structure 17. The panel 22 may have any shape, and may also have any dimensions. For example, the panel 22 may have the same (or substantially the same) shape and/or dimensions as the inner perimeter of the frame 10. As such, in particular embodiments, the panel 22 may be flush against the inner perimeter of the frame 10. As another example, the panel 22 may have larger dimensions (or a different shape) than the inner perimeter of the frame 10. As such, in particular embodiments, the panel 22 may be coupled to the exterior of the frame 10 (such as coupled to the rails 12) or to the structure 17. As a further example, the panel 22 may have smaller dimensions (or a different shape) than the inner perimeter of the frame 10. As another example, the panel 22 may have an outer perimeter of, for example, approximately 7⅝"×15¾". The panel 22 may also have any thickness 25. For example, panel 22 may have a thickness 25 of 0.15", 0.25", 0.50", 1.0" 1.50", 2.0", 3.0", 4.0", or any other thickness 25. The panel 22 may be formed (or made) of any material. For example, the panel 22 may be formed of a corrosion resistant material, such as stainless steel, spring steel, plastic, a polymer, cement, brick, any other corrosion resistant material, or any combination of the preceding.

As is discussed above, the flood vent 8 may be inserted (or otherwise installed) into an opening 18 in a structure 17. The structure 17 may be any structure. For example, the structure may be a building, a wall, a foundation, a basement, a garage, a garage door, a foyer, an entry, any structure located below base flood plain levels, any other structure, or any combination of the preceding. The structure 17 may include one or more edges 19 that form an inner perimeter of the opening 18 in the structure 17. The opening 18 may have any shape and/or dimensions for receiving the frame 10 (or frames 10) of the flood vent 8. For example, when the frame 10 has a rectangular outer perimeter of 8"×16", the opening 18 may have a rectangular inner perimeter of 8¼"×16¼". As another example, when the flood vent 8 has multiple frames 10 (as is discussed above) and a rectangular outer perimeter of 16"×32", the opening 18 may have a rectangular inner perimeter of 16⅜"×33". As such, the flood vent 8 may be inserted (or otherwise installed) into the opening 18 of the structure 17. The opening 18 may be added to the structure 17 in any manner. For example, the opening 18 may be added (or cut into) the structure 17 after the structure 17 is already built. As another example, the opening 18 may be left in (or built into) the structure 17 as the structure 17 is being built. In such an example, the frame 10 of the flood vent 8 (or the entire flood vent 8) may be built into the opening 18 of the structure 17 as the structure 17 is being built.

Modifications, additions, or omissions may be made to the flood vent 8 of FIGS. 1-2 without departing from the scope of the disclosure. For example, although the frame 10 of the flood vent 8 has been described above as including rails 12, in particular embodiments, the frame 10 may not include any rails 12. As another example, although the flood vent 8 has been described above as including a frame 10, in particular embodiments, the flood vent 8 may not include a frame 10. In such embodiments, the panel 22 may be configured to be coupled directly to the structure 17. As such, in particular embodiments, the panel 22 may be inserted into (or installed on) the structure 17 (such as the opening 18 in the structure 17) without the use of a frame 10. Furthermore, in such embodiments, the opening 18 (itself) may form the fluid passageway through the structure 17.

As is discussed above, a flood vent may typically include a screen or grille that may allow flooding fluids to pass into or out of the structure through the flood vent, but that may prevent animals or other pests from entering or exiting the structure through the flood vent. Unfortunately, such typical flood vents may be deficient. For example, although the screen or grille of the flood vent may prevent objects from entering the flood vent, the screen or grille may also prevent fluids from sufficiently passing through the flood vent. In particular, during a flood event, a large quantity of water may attempt to pass through the flood vent. If openings in the screen or grille are not large enough (or if the flood vent does not have any openings or if the openings in the flood vent are not open), the water may be prevented from quickly passing through the flood vent, which may disrupt the equalization of interior and exterior hydrostatic forces caused by flooding waters. Furthermore, the water may be carrying various pieces of debris (such as tree limbs and dirt) that may clog the openings, preventing the flood vent from allowing any (or most) of the water to pass through the flood vent. Conversely, if the openings are too large, the openings may not prevent objects (such as small animals) from entering the flood vent. Contrary to these typical flood vents, FIGS. 3-7 illustrate examples of flood vents that may provide one or more advantages.

Figure 3A:
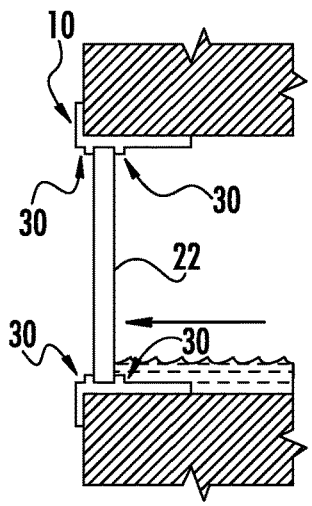
FIGS. 3A-3C illustrate the flood vent of FIGS. 1-2 having a first example of connectors.
Figure 3B:
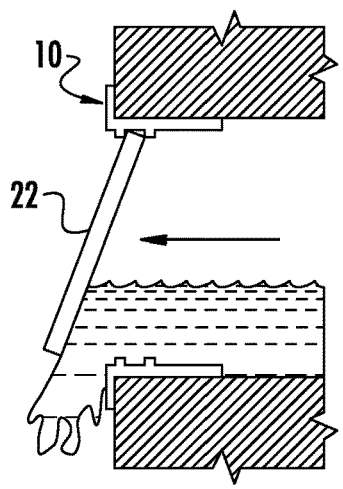
Figure 3C:
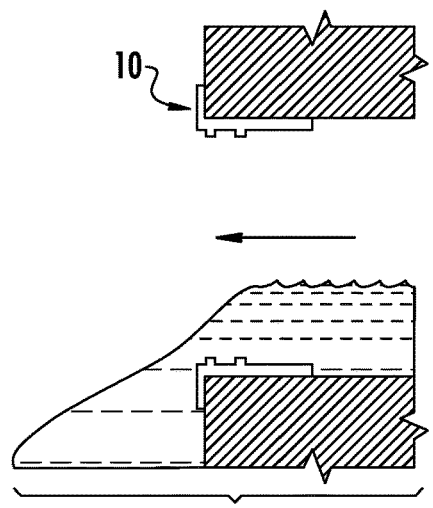

FIGS. 3A-3C illustrate the flood vent 8 of FIGS. 1-2 having example connectors 30. Connectors 30 may be configured to couple the panel 22 to the frame 10. Furthermore, the connectors 30 may be further configured to uncouple the panel 22 from the frame 10. For example, the connectors 30 may be configured to uncouple the panel 22 from the frame 10 when a predetermined amount of pressure is applied to the panel 22, such as by a fluid or an object (such as a tree limb or dirt) carried by the fluid. As such, in particular embodiments, the panel 22 of flood vent 8 may prevent (or substantially prevent) objects and/or fluids from passing through the flood vent 8 until a predetermined amount of pressure is applied to the panel 22, and after the predetermined amount of pressure is applied to the panel 22, the panel 22 may be uncoupled from the flood vent 8 and may no longer prevent objects and/or fluids from passing through the flood vent 8 (or the amount of blockage of the fluid passageway provided by the panel 22 may be reduced). This may, in particular embodiments, allow the flood vent 8 to provide for equalization of hydrostatic forces caused by, for example, flooding fluids, even when the flooding fluids carry objects (such as debris) that may clog the openings 26 in the panel 22, when the openings 26 in the panel 22 are too small to allow sufficient fluids to pass through the flood vent 8, when the openings 26 in the panel are closed, and/or when the panel 22 does not include any openings 26.

As is discussed above with regard to FIGS. 1-2, the flood vent 8 includes a frame 10 and a panel 22. The frame 10 may be configured to be inserted into an opening 18 in a structure 17, and may be further configured to form a fluid passageway through the opening 18 in the structure 17, thereby allowing the flooding fluids to enter and/or exit the structure 17. The panel 22 may be configured to be coupled to the frame 10. Furthermore, the panel 22 may be configured to be coupled to the frame 10 in the fluid passageway formed by the frame 10. Additionally, when coupled to the frame 10, the panel 22 may at least partially block the fluid passageway formed by the frame 10, an example of which is seen in FIG. 3A. The panel 22 may be coupled to the frame 10 by one or more connectors 30. The panel 22 may be any type of panel. For example, as is illustrated in FIGS. 3A-3C, the panel 22 may be a solid panel that may prevent all (or substantially all) fluids (such as water and/or air) from passing through the panel 22, as well as prevent (or substantially prevent) objects (such as small animals) from passing through the panel 22. As another example, the panel 22 may include one or more openings 26 configured to allow fluids (such as water and/or air) to pass through the panel 22, but prevent objects (such as small animals) from passing through the panel 22.

A connector 30 may be any type of connector that may couple the panel 22 to the frame 10, and that may further uncouple the panel 22 from the frame 10 when, for example, a predetermined amount of pressure is applied to the panel 22. As a first example, a connector 30 may be one or more raised bumps (or raised lips), as is illustrated in FIGS. 3A-3C. The raised bumps may allow a panel 22 to be installed in the frame 10, thereby coupling the panel 22 to the frame 10, as is seen in FIG. 3A. For example, an installer (such as a person) may push the panel 22 into the frame 10 with enough force to cause the panel 22 to move past the first set of raised bumps. In such an example, the panel 22 may then rest in a gap (or be sandwiched) in-between the first set of bumps and a second set of bumps (as is seen in FIG. 3A), thereby coupling the panel 22 to the frame 10. Furthermore, the raised bumps may continue to couple the panel 22 to the frame 10 until a predetermined amount of pressure is applied to the panel 22 by, for example, a fluid (such as flooding water). Once the predetermined amount of pressure is applied to the panel 22, the panel 22 may be forced past a set of the raised bumps, as is seen in FIG. 3B. This may uncouple the panel 22 from the frame 10, causing the panel 22 to be completely separated from the frame 10, and be carried away from the frame 10, as is seen in FIG. 3C. As such, in particular embodiments, the flood vent 8 may no longer prevent objects and/or fluids from passing through the flood vent 8 (or the amount of blockage of the fluid passageway provided by the panel 22 may be reduced).

As a second example, a connector 30 may be one or more pieces of velcro configured to couple the panel 22 to the frame 10, and that may be further configured to uncouple the panel 22 from the frame 10 when, for example, a predetermined amount of pressure is applied to the panel 22. The pieces of velcro may include, for example, one or more first pieces of velcro that are coupled to the frame 10 and/or the structure 17, and one or more second pieces of velcro that are coupled to the panel 22. The first pieces of velcro may be further coupled to the second pieces of velcro, thereby coupling the panel 22 to the frame 10 (and/or the structure 17). Furthermore, the pieces of velcro may continue to couple the panel 22 to the frame 10 (and/or the structure 17) until a predetermined amount of pressure is applied to the panel 22 by, for example, a fluid (such as flooding water). Once the predetermined amount of pressure is applied to the panel 22, the coupling between the pieces of velcro may be broken. This may uncouple the panel 22 from the frame 10 (and/or the structure 17), causing the panel 22 to be completely separated from the frame 10, and be carried away from the frame 10. As such, in particular embodiments, the flood vent 8 may no longer prevent objects and/or fluids from passing through the flood vent 8 (or the amount of blockage of the fluid passageway provided by the panel 22 may be reduced).

As a third example, a connector 30 may be one or more mechanical fasteners configured to couple the panel 22 to the frame 10, and that may be further configured to uncouple the panel 22 from the frame 10 when, for example, a predetermined amount of pressure is applied to the panel 22. The mechanical fasteners may include any one or more devices and/or objects that may mechanically fasten the panel 22 to the frame 10 (and/or the structure 17), such as one or more nails, screws, rivets, nuts and bolts, rods and studs, anchors, pins, retaining rings and/or clips, any other devices that may mechanically fasten the panel 22 to the frame 10 (and/or the structure 17), or any combination of the preceding. Furthermore, the mechanical fasteners may be configured to uncouple the panel 22 from the frame 10 when, for example, a predetermined amount of pressure is applied to the panel 22. For example, the mechanical fasteners may be configured to break or otherwise uncouple from the panel 22 (and/or frame 10 and/or structure 17) when, for example, a predetermined amount of pressure is applied to the panel 22. In particular embodiments, the mechanical fasteners may be engineered and/or modified to break or otherwise uncouple from the panel 22 (and/or frame 10 and/or structure 17) when, for example, a predetermined amount of pressure is applied to the panel 22.

The mechanical fasteners may include one or more mechanical fasteners coupled to the panel 22, the frame 10, and/or the structure 17, thereby coupling the panel 22 to the frame 10 (and/or the structure 17). Furthermore, the mechanical fasteners may continue to couple the panel 22 to the frame 10 (and/or the structure 17) until a predetermined amount of pressure is applied to the panel 22 by, for example, a fluid (such as flooding water). Once the predetermined amount of pressure is applied to the panel 22, the mechanical fasteners may break or otherwise uncouple from the panel 22 (and/or frame 10 and/or structure 17). This may uncouple the panel 22 from the frame 10 (and/or the structure 17), causing the panel 22 to be completely separated from the frame 10, and be carried away from the frame 10. As such, in particular embodiments, the flood vent 8 may no longer prevent objects and/or fluids from passing through the flood vent 8 (or the amount of blockage of the fluid passageway provided by the panel 22 may be reduced).

As a fourth example, a connector 30 may be an adhesive configured to couple the panel 22 to the frame 10, and that may be further configured to uncouple the panel 22 from the frame 10 when, for example, a predetermined amount of pressure is applied to the panel 22. The adhesive may include any adhesive substance that may adhere the panel 22 to the frame 10 (and/or the structure 17), such as glue, cement, Lexel® adhesive, any other adhesive substance that may adhere the panel 22 to the frame 10 (and/or the structure 17), or any combination of the preceding. Furthermore, the adhesive may be further configured to uncouple the panel 22 from the frame 10 when, for example, a predetermined amount of pressure is applied to the panel 22. For example, the adhesive may be configured to peel off, break, or otherwise uncouple from the panel 22 (and/or frame 10 and/or structure 17) when, for example, a predetermined amount of pressure is applied to the panel 22. In particular embodiments, the adhesive may be engineered and/or modified to peel off, break, or otherwise uncouple from the panel 22 (and/or frame 10 and/or structure 17) when, for example, a predetermined amount of pressure is applied to the panel 22. In particular embodiments, the amount of adhesive used to adhere the panel 22 to the frame 10 (and/or frame 10 and/or structure 17) may be selected to cause the adhesive to peel off, break, or otherwise uncouple from the panel 22 (and/or frame 10 and/or structure 17) when, for example, a predetermined amount of pressure is applied to the panel 22.

The adhesive may include one or more portions of the adhesive coupled to the panel 22, the frame 10, and/or the structure 17, thereby coupling the panel 22 to the frame 10 (and/or the structure 17). Furthermore, the portions of the adhesive may continue to couple the panel 22 to the frame 10 (and/or the structure 17) until a predetermined amount of pressure is applied to the panel 22 by, for example, a fluid (such as flooding water). Once the predetermined amount of pressure is applied to the panel 22, the adhesive may peel off, break, or otherwise uncouple from the panel 22 (and/or frame 10 and/or structure 17). This may uncouple the panel 22 from the frame 10 (and/or the structure 17), causing the panel 22 to be completely separated from the frame 10, and be carried away from the frame 10. As such, in particular embodiments, the flood vent 8 may no longer prevent objects and/or fluids from passing through the flood vent 8 (or the amount of blockage of the fluid passageway provided by the panel 22 may be reduced).

As a fifth example, a connector 30 may be one or more pressure-based connectors configured to couple the panel 22 to the frame 10, and that may be further configured to uncouple the panel 22 from the frame 10 when, for example, a predetermined amount of pressure is applied to the panel 22. The pressure-based connectors may include any type of connector that may apply pressure (or otherwise utilize pressure) to couple the panel 22 to the frame 10 (and/or the structure 17). As an example, the pressure-based connectors may be a pressure-based clip (such as a spring clip) configured to fit in-between the edges 23 of the panel 22 and the inner edges 13 of the frame 10. In such an example, when the panel 22 is installed into the frame 10 (or the opening 18), the pressure-based connectors may be compressed by the edge 23 of the panel 22 and the edge 13 of the frame 10 (or the edge 19 of the opening 18), thereby causing the pressure-based connectors to push outward against the edge 13 of the frame 10 and inward against the edge 23 of the panel 22. Such pressure applied by the pressure-based connectors (along with friction, in particular embodiments) may at least couple the panel 22 to the frame 10. Furthermore, although the pressure-based connectors have been described above as being a separate component from the panel 22, in particular embodiments, the pressure-based connectors may be the panel 22 (or part of the panel 22), itself. For example, the panel 22 may have dimensions larger than the inner perimeter of the frame 10. In such an example, inserting the panel 22 may cause the edges 23 and/or corners of the panel 22 to be bent in (or out) against the frame 10, thereby applying pressure that may couple the panel 22 to the frame 10 (or the structure 17). The pressure-based connectors may be further configured to uncouple the panel 22 from the frame 10 when, for example, a predetermined amount of pressure is applied to the panel 22. For example, the pressure-based connectors may be configured to break, slip off, or otherwise uncouple from the panel 22 (and/or frame 10 and/or structure 17) when, for example, a predetermined amount of pressure is applied to the panel 22. In particular embodiments, the amount of pressure applied by the pressure-based connectors may be configured to be overcome by the predetermined amount of pressure applied to the panel 22 by, for example, the fluid.

The pressure-based connectors may include one or more pressure-based connectors coupled to (and/or applying pressure to) the panel 22, the frame 10, and/or the structure 17, thereby coupling the panel 22 to the frame 10 (and/or the structure 17). Furthermore, the pressure-based connectors may continue to couple the panel 22 to the frame 10 (and/or the structure 17) until a predetermined amount of pressure is applied to the panel 22 by, for example, a fluid (such as flooding water). Once the predetermined amount of pressure is applied to the panel 22, the pressure-based connectors may break, slip off, or otherwise uncouple from the panel 22 (and/or frame 10 and/or structure 17). This may uncouple the panel 22 from the frame 10 (and/or the structure 17), causing the panel 22 to be completely separated from the frame 10, and be carried away from the frame 10. As such, in particular embodiments, the flood vent 8 may no longer prevent objects and/or fluids from passing through the flood vent 8 (or the amount of blockage of the fluid passageway provided by the panel 22 may be reduced).

As a sixth example, a connector 30 may be one or more permanent attachments configured to couple the panel 22 to the frame 10, and that may be further configured to break (or otherwise fail) so as to uncouple the panel 22 from the frame 10 when, for example, a predetermined amount of pressure is applied to the panel 22. The permanent attachment may include any one or more attachments that may permanently couple (and/or fixedly couple and/or couple in a manner that requires a break or a failure in order to uncouple) the panel 22 to the frame 10 (and/or the structure 17), such as a weld, the panel 22 being formed integral with the frame 10, any other attachment, or any combination of the preceding. Furthermore, the permanent attachments may be configured to uncouple the panel 22 from the frame 10 when, for example, a predetermined amount of pressure is applied to the panel 22. For example, the permanent attachments may be configured to break, fail, or otherwise uncouple from the panel 22 (and/or frame 10 and/or structure 17) when, for example, a predetermined amount of pressure is applied to the panel 22. In particular embodiments, the permanent attachments may be engineered and/or modified to break, fail, or otherwise uncouple from the panel 22 (and/or frame 10 and/or structure 17) when, for example, a predetermined amount of pressure is applied to the panel 22. For example, the permanent attachments (such as a weld) may include one or more engineered defects that may cause them to break or fail. As another example, a pressure (or stress) may be constantly applied to the permanent attachments, thereby causing the additional predetermined amount of pressure to cause the permanent attachments to break or fail.

The permanent attachments may include one or more permanent attachments coupled to the panel 22, the frame 10, and/or the structure 17, thereby coupling the panel 22 to the frame 10 (and/or the structure 17). Furthermore, the permanent attachments may continue to couple the panel 22 to the frame 10 (and/or the structure 17) until a predetermined amount of pressure is applied to the panel 22 by, for example, a fluid (such as flooding water). Once the predetermined amount of pressure is applied to the panel 22, the permanent attachments may break, fail, or otherwise uncouple from the panel 22 (and/or frame 10 and/or structure 17). This may uncouple the panel 22 from the frame 10 (and/or the structure 17), causing the panel 22 to be completely separated from the frame 10, and be carried away from the frame 10. As such, in particular embodiments, the flood vent 8 may no longer prevent objects and/or fluids from passing through the flood vent 8 (or the amount of blockage of the fluid passageway provided by the panel 22 may be reduced).

The flood vent 8 may include any number of connectors 30. For example, the flood vent 8 may include one connector 30, two connectors 30, three connectors 30, four connectors 30, six connectors 30, eight connectors 30, ten connectors 30, or any other number of connectors 30. The connectors 30 may be attached or otherwise coupled to any portion of the panel 22, frame 10, and/or structure 17. For example, the connectors 30 may be attached to the edges 23 of the panel 22 and/or the edges 13 of the frame 10. As another example, the connectors 30 (such as screws) may be positioned through one or more holes (such as one or more screw holes) in side 24a (for example) of the panel 22, and inserted into one or more holes in the frame 10 and/or the structure 17, thereby coupling the panel 22 to the frame 10 and/or the structure 17. The connectors 30 may be added to (or otherwise coupled) to the panel 22 (and/or frame 10 and/or structure 17), the connectors 30 may be formed integral with (or formed as a part of) the panel 22 (and/or frame 10 and/or structure 17), or any combination of the preceding.

The connectors 30 may have any size and/or shape that may allow the connectors 30 to uncouple the panel 22 when a predetermined amount of pressure is applied to the panel 22. For example, the length of the connectors 30 (such as one or more mechanical fasteners) may be selected to cause the connectors 30 to break, fail, or otherwise uncouple the panel 22 when the predetermined amount of pressure is applied to the panel 22. The connectors 30 may be formed from any material that may allow the connectors 30 to uncouple the panel 22 when a predetermined amount of pressure is applied to the panel 22. For example, the connectors 30 may be formed from rubber, plastic, a polymer, a foam, a metal (such as aluminum, stainless steel, spring steel, a galvanized material, any other metal, or any combination of the preceding), any other material that may allow the connectors 30 to uncouple the panel 22 when a predetermined amount of pressure is applied to the panel 22, or any combination of the preceding. In particular, the connectors 30 (such as one or more mechanical fasteners) may be formed from a particular plastic (for example) that causes the mechanical fasteners to break or fail when the predetermined amount of pressure is applied to the panel 22.

As is discussed above, the connectors 30 may be configured to uncouple the panel 22 from the frame 10 (and/or structure 17) when, for example, a predetermined amount of pressure is applied to the panel 22. In particular embodiments, the predetermined amount of pressure may refer to the lowest amount of pressure (or approximately the lowest amount of pressure) that would cause the panel 22 to prevent the equalization of interior and exterior hydrostatic forces caused by a fluid (such as flooding water) attempting to flow through the flood vent 8. As an example, the predetermined amount of pressure may be 0.5 PSI, 1 PSI, 1.5 PSI, 2 PSI, 2.5 PSI, 3 PSI, 3.5 PSI, 4 PSI, 4.5 PSI, 5 PSI, 6 PSI, 7 PSI, 10 PSI, approximately 0.5 PSI (i.e., 0.5 PSI+/−0.2 PSI), approximately 1 PSI, approximately 1.5 PSI, approximately 2 PSI, approximately 2.5 PSI, approximately 3 PSI, approximately 3.5 PSI, approximately 4 PSI, approximately 4.5 PSI, approximately 5 PSI, approximately 6 PSI, approximately 7 PSI, approximately 10 PSI, or any other amount of pressure that may prevent the equalization of interior and exterior hydrostatic forces caused by a fluid (such as flooding water) attempting to flow through the flood vent 8. As a further example, the predetermined amount of pressure may be a pressure range of 0.5 PSI-7 PSI, 0.5-5.0 PSI, 0.5-4.0 PSI, 0.5-3.0 PSI, 1.0-7.0 PSI, 1.0-5.0 PSI, 1.0-4.0 PSI, 1.0-3.0 PSI, 1.5-7.0 PSI, 1.5-5.0 PSI, 1.5-4.0 PSI, 1.5-3.0 PSI, 2.0-7.0 PSI, 2.0-5.0 PSI, 2.0-4.0 PSI, 2.0-3.0 PSI, or any other pressure range that may prevent the equalization of interior and exterior hydrostatic forces caused by a fluid (such as flooding water) attempting to flow through the flood vent 8.

In particular embodiments, the predetermined amount of pressure may be the lowest pressure at which the connectors 30 may be configured to uncouple the panel 22 from the frame 10 (and/or structure 17). For example, if an amount of pressure below the predetermined amount of pressure is applied to the panel 22, the connectors 30 may not uncouple the panel 22 from the frame 10 (and/or structure). On the other hand, if an amount of pressure equal to the predetermined amount of pressure (or above the predetermined amount of pressure) is applied to the panel 22, the connectors 30 may uncouple the panel 22 from the frame 10 (and/or structure 17).

In particular embodiments, the connectors 30 may be configured to uncouple the panel 22 from the frame 10 (and/or structure 17) if the predetermined amount of pressure is applied to any portion of the panel 22. For example, the connectors 30 may be configured to uncouple the panel 22 from the frame 10 (and/or structure 17) if the predetermined amount of pressure is applied to a bottom portion of the panel 22, a top portion of the panel 22, a left and/or right side portion of the panel 22, any other portion of the panel 22, or any combination of the preceding. In particular embodiments, the predetermined amount of pressure for causing the connectors 30 to uncouple the panel 22 from the frame 10 (and/or structure 17) may change based on (or be a function of) the portion of the panel 22 to which the predetermined amount of pressure is applied. For example, the predetermined amount of pressure may be greater if the predetermined amount of pressure is applied to the bottom portion of the panel 22 (which may be indicative of a less amount of flooding fluids, for example) than if the predetermined amount of pressure is applied to the top portion of the panel 22 (which may be indicative of a greater amount of flooding fluids, for example). In particular embodiments, the predetermined amount of pressure for causing the connectors 30 to uncouple the panel 22 from the frame 10 (and/or structure 17) may change based on (or be a function of) the type of panel 22 included in the flood vent 8. For example, the predetermined amount of pressure may be less if the panel 22 is a panel without any openings 26 (or with openings that may be closed, using louvers, for example) than if the panel 22 includes openings 26 that may not be closed (or if the panel 22 is a screen). In such an example, a panel 22 without openings 26 (when compared to a panel 22 with openings 26) may more easily (or quickly) prevent equalization of interior and exterior hydrostatic forces caused by a fluid, and therefore it may be advantageous to uncouple the panel 22 without openings 26 at a lower amount of pressure (when compared to a panel 22 with openings 26). As another example, the predetermined amount of pressure may be less if the panel 22 is a panel with less openings 26 (and/or with smaller openings 26) than if the panel 22 includes more openings 26 (and/or has bigger openings 26). In such an example, a panel 22 with less openings 26 (when compared to a panel 22 with more openings 26) may more easily (or quickly) prevent equalization of interior and exterior hydrostatic forces caused by a fluid, and therefore it may be advantageous to uncouple the panel 22 with less openings 26 at a lower amount of pressure (when compared to a panel 22 with more openings 26).

In particular embodiments, the connectors 30 may be configured to uncouple the panel 22 from the frame 10 (and/or structure 17) if the predetermined amount of pressure is applied to any side of the panel 22. For example, the connectors 30 may be configured to uncouple the panel 22 from the frame 10 (and/or structure 17) if the predetermined amount of pressure is applied to side 24b of the panel 22 (e.g., the side of the panel 22 facing the interior of the structure 17), thereby causing the panel 22 to be uncoupled from the frame 10 and be carried by the fluids, for example, outside of the structure 17, as is illustrated in FIGS. 3A-3C. In particular embodiments, this may cause panel 22 to be uncoupled from the frame 10 (and/or structure 17) when flooding fluids, for example, enter the flood vent 8 from inside the structure 17. As another example, the connectors 30 may be configured to uncouple the panel 22 from the frame 10 (and/or structure 17) if the predetermined amount of pressure is applied to side 24a of the panel 22 (e.g., the side of the panel 22 facing the exterior of the structure 17), thereby causing the panel 22 to be uncoupled from the frame 10 and be carried by the fluids, for example, inside of the structure 17 (e.g., in a direction from left-to-right in FIGS. 3A-3C). In particular embodiments, this may cause panel 22 to be uncoupled from the frame 10 (and/or structure 17) when flooding fluids, for example, enter the flood vent 8 from outside the structure 17. As a further example, the connectors 30 may be configured to uncouple the panel 22 from the frame 10 (and/or structure 17) if the predetermined amount of pressure is applied to either the side 24b of the panel 22 (e.g., the side of the panel 22 facing the interior of the structure 17) or the side 24a of the panel 22 (e.g., the side of the panel 22 facing the exterior of the structure 17). In particular embodiments, this may cause panel 22 to be uncoupled from the frame 10 (and/or structure 17) when flooding fluids, for example, enter the flood vent 8 from either inside the structure 17 or outside the structure 17.

Modifications, additions, or omissions may be made to the flood vent 8 of FIGS. 3A-3C without departing from the scope of the disclosure. For example, although the panel 22 has been described above as being entirely uncoupled from the frame 10 (and/or structure 17), in particular embodiments, only a portion of the panel 22 may be uncoupled from the frame 10 (and/or structure 17). In such an example, a first portion of the panel 22 (e.g., an inner area of the panel 22) may be uncoupled from the frame 10 (and/or structure 17) when the predetermined amount of pressure is applied to the panel 22 (and/or the first portion of the panel 22), while the second portion of the panel 22 (e.g., an outer area of the panel 22) may remain coupled to the frame 10 (and/or structure 17). Furthermore, in such an example, connectors 30 may be configured to couple the first portion of the panel 22 to the second portion of the panel 22 (and/or the frame 10 and/or the structure 17). As another example, although the flood vent 8 has been described above as including a frame 10, in particular embodiments, the flood vent 8 may not include a frame 10. In such embodiments, the panel 22 may be configured to be coupled directly to the structure 17. As such, in particular embodiments, the panel 22 may be inserted into (or installed on) the structure 17 (such as the opening 18 in the structure 17) without the use of a frame 10, and the connector(s) 30 may couple the panel 22 directly to the structure 17.

Figure 4A:
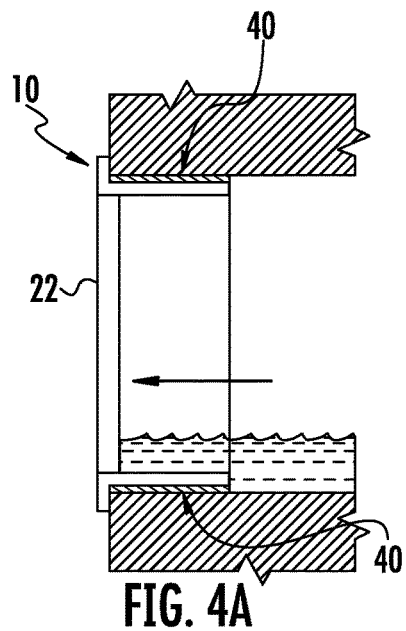
FIGS. 4A-4C illustrate the flood vent of FIGS. 1-2 having a second example of connectors.
Figure 4B:
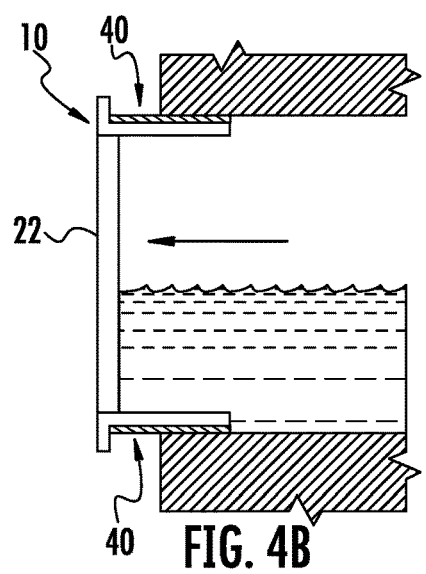
Figure 4C:
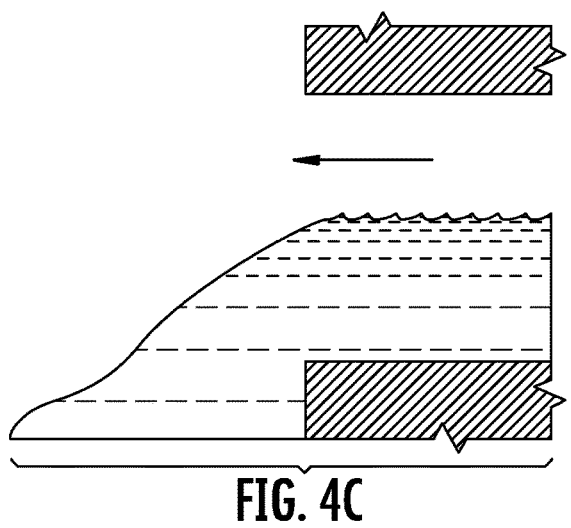

FIGS. 4A-4C illustrate the flood vent 8 of FIGS. 1-2 having example connectors 40. Connectors 40 may be configured to couple the frame 10 to the structure 17. Furthermore, the connectors 40 may be further configured to uncouple the frame 10 from the structure 17. For example, the connectors 40 may be configured uncouple the frame 10 from the structure 17 when a predetermined amount of pressure is applied to the panel 22 and/or the frame 10, such as by a fluid or an object (such as a tree limb or dirt) carried by the fluid. As such, in particular embodiments, the panel 22 of flood vent 8 may prevent (or substantially prevent) objects and/or fluids from passing through the flood vent 8 until a predetermined amount of pressure is applied to the panel 22 and/or the frame 10, and after the predetermined amount of pressure is applied to the panel 22 and/or the frame 10, the frame 10 (along with the panel 22) may be uncoupled from the structure 17 and the panel 22 may no longer prevent objects and/or fluids from passing through the opening 18 in the structure 17 (or the amount of blockage of the fluid passing through the opening 18 may be reduced). This may, in particular embodiments, allow the flood vent 8 to provide for equalization of hydrostatic forces caused by, for example, flooding fluids, even when the flooding fluids carry objects (such as debris) that may clog the openings 26 in the panel 22, when the openings 26 in the panel 22 are too small to allow sufficient fluids to pass through the flood vent 8, when the openings 26 in the panel are closed, and/or when the panel 22 does not include any openings 26.

As is discussed above with regard to FIGS. 1-2, the flood vent 8 includes a frame 10 and a panel 22. The frame 10 may be configured to be inserted into an opening 18 in a structure 17, and may be further configured to form a fluid passageway through the opening 18 in the structure 17, thereby allowing the flooding fluids to enter and/or exit the structure 17. The frame 10 may be coupled to the structure 18 using one or more connectors 40. The flood vent 8 further includes the panel 22. The panel 22 may be configured to be coupled to the frame 10. Furthermore, the panel 22 may be configured to be coupled to the frame 10 in the fluid passageway formed by the frame 10. Additionally, when coupled to the frame 10, the panel 22 may at least partially block the fluid passageway formed by the frame 10, an example of which is seen in FIGS. 4A-4B. The panel 22 may be coupled to the frame 10 in any manner. For example, the panel 22 may be formed integral with the frame 10, welded to the frame 10, coupled to the frame 10 using an adhesive (such as glue, cement, and/or Lexel®), attached to the frame 10 using one or more pins that may be inserted or snapped into one or more channels or hooks in the frame 10, attached to the frame 10 using one or more rivets, nails, and/or any other connector, coupled to the frame 10 in any other manner, or any combination of the preceding. The panel 22 may be any type of panel. For example, as is illustrated in FIGS. 4A-4B, the panel 22 may be a solid panel that may prevent all (or substantially all) fluids (such as water and/or air) from passing through the panel 22, as well as preventing (or substantially preventing) objects (such as small animals) from passing through the panel 22. As another example, the panel 22 may include one or more openings 26 configured to allow fluids (such as water and/or air) to pass through the panel 22, but prevent objects (such as small animals) from passing through the panel 22.

A connector 40 may be any type of connector that may couple the frame 10 to the structure 17, and that may further uncouple the frame 10 from the structure 17 when, for example, a predetermined amount of pressure is applied to the panel 22 and/or frame 10. As a first example, a connector 40 may be an adhesive configured to couple the frame 10 to the structure 17, and that may be further configured to uncouple the frame 10 from the structure 17 when, for example, a predetermined amount of pressure is applied to the panel 22 and/or the frame 10. The adhesive may include any adhesive substance that may adhere the frame 10 to the structure 17, such as glue, cement, Lexel® adhesive, any other adhesive substance that may adhere the frame 10 to the structure 17, or any combination of the preceding. Furthermore, the adhesive may be further configured to uncouple the frame 10 from the structure 17 when, for example, a predetermined amount of pressure is applied to the panel 22 and/or the frame 10. For example, the adhesive may be configured to peel off, break, or otherwise uncouple from the frame 10 and/or structure 17 when, for example, a predetermined amount of pressure is applied to the panel 22 and/or the frame 10. In particular embodiments, the adhesive may be engineered and/or modified to peel off, break, or otherwise uncouple from the frame 10 and/or structure 17 when, for example, a predetermined amount of pressure is applied to the panel 22 and/or the frame 10. In particular embodiments, the amount of adhesive used to adhere the frame 10 to the structure 17 may be selected to cause the adhesive to peel off, break, or otherwise uncouple from the frame 10 and/or structure 17 when, for example, a predetermined amount of pressure is applied to the panel 22 and/or the frame 10.

The adhesive may include one or more portions of the adhesive coupled to the frame 10 and/or the structure 17, thereby coupling the frame 10 to the structure 17, as is illustrated in FIG. 4A. Furthermore, the portions of the adhesive may continue to couple the frame 10 to the structure 17 until a predetermined amount of pressure is applied to the panel 22 and/or the frame 10 by, for example, a fluid (such as flooding water). Once the predetermined amount of pressure is applied to the panel 22 and/or the frame 10, the adhesive may peel off, break, or otherwise uncouple from the panel 22 and/or the structure 17, as is seen in FIG. 4B. This may uncouple the frame 10 from the structure 17, causing the frame 10 to be completely separated from the structure 17, and be carried away from the structure 17, as is seen in FIG. 4C. As such, in particular embodiments, the flood vent 8 may no longer prevent objects and/or fluids from passing through the opening 18 in the structure 17 (or the amount of blockage of the fluid passing through the opening 18 may be reduced).

As a second example, a connector 40 may be one or more raised bumps (or raised lips) in the opening 18 of the structure 17. The raised bumps may allow a frame 10 to be installed in the opening 18, thereby coupling frame 10 to the structure 17. For example, an installer (such as a person) may push the frame 10 into the opening 18 with enough force to cause the frame 10 to move past the first set of raised bumps. In such an example, the frame 10 may then rest in a gap in-between (or sandwiched by) the first set of bumps and a second set of bumps, thereby coupling the frame 10 to the structure 17. Furthermore, the raised bumps may continue to couple the frame 10 to the structure 17 until a predetermined amount of pressure is applied to the panel 22 and/or the frame 10 by, for example, a fluid (such as flooding water). Once the predetermined amount of pressure is applied to the panel 22 and/or the frame 10, the frame 10 may be forced past a set of the raised bumps. This may uncouple the frame 10 from the structure 17, causing the frame 10 to be completely separated from the structure 17, and be carried away from the structure 17. As such, in particular embodiments, the flood vent 8 may no longer prevent objects and/or fluids from passing through the opening 18 in the structure 17 (or the amount of blockage of the fluid passing through the opening 18 may be reduced).

As a third example, a connector 40 may be one or more pieces of velcro configured to couple the frame 10 to the structure 17, and that may be further configured to uncouple the frame 10 from the structure 17 when, for example, a predetermined amount of pressure is applied to the panel 22 and/or the frame 10. The pieces of velcro may include, for example, one or more first pieces of velcro that are coupled to the frame 10, and one or more second pieces of velcro that are coupled to the structure 17. The first pieces of velcro may be coupled to the second pieces of velcro, thereby coupling the frame 10 to the structure 17. Furthermore, the pieces of velcro may continue to couple the frame 10 to the structure 17 until a predetermined amount of pressure is applied to the panel 22 and/or the frame 10 by, for example, a fluid (such as flooding water). Once the predetermined amount of pressure is applied to the panel 22 and/or the frame 10, the coupling between the pieces of velcro may be broken. This may uncouple the frame 10 from the structure 17, causing the frame 10 to be completely separated from the structure 17, and be carried away from the structure 17. As such, in particular embodiments, the flood vent 8 may no longer prevent objects and/or fluids from passing through the opening 18 in the structure 17 (or the amount of blockage of the fluid passing through the opening 18 may be reduced).

As a fourth example, a connector 40 may be one or more mechanical fasteners configured to couple the frame 10 to the structure 17, and that may be further configured to uncouple the frame 10 from the structure 17 when, for example, a predetermined amount of pressure is applied to the panel 22 and/or the frame 10. The mechanical fasteners may include one or more devices that may mechanically fasten the frame 10 to the structure 17, such as one or more nails, screws, rivets, nuts and bolts, rods and studs, anchors, pins, retaining rings and/or clips, any other devices that may mechanically fasten the frame 10 to the structure 17, or any combination of the preceding. Furthermore, the mechanical fasteners may be further configured to uncouple the frame 10 from the structure 17 when, for example, a predetermined amount of pressure is applied to the panel 22 and/or the frame 10. For example, the mechanical fasteners may be configured to break or otherwise uncouple from the frame 10 and/or structure 17 when, for example, a predetermined amount of pressure is applied to the panel 22 and/or the frame 10. In particular embodiments, the mechanical fasteners may be engineered and/or modified to break or otherwise uncouple from the frame 10 and/or structure 17 when, for example, a predetermined amount of pressure is applied to the panel 22 and/or the frame 10.

The mechanical fasteners may include one or more mechanical fasteners coupled to the frame 10 and/or the structure 17, thereby coupling the frame 10 to the structure 17. Furthermore, the mechanical fasteners may continue to couple the frame 10 to the structure 17 until a predetermined amount of pressure is applied to the panel 22 and/or the frame 10 by, for example, a fluid (such as flooding water). Once the predetermined amount of pressure is applied to the panel 22 and/or the frame 10, the mechanical fasteners may break or otherwise uncouple from the frame 10 and/or structure 17. This may uncouple the frame 10 from the structure 17, causing the frame 10 to be completely separated from the structure 17, and be carried away from the structure 17. As such, in particular embodiments, the flood vent 8 may no longer prevent objects and/or fluids from passing through the opening 18 in the structure 17 (or the amount of blockage of the fluid passing through the opening 18 may be reduced).

As a fifth example, a connector 40 may be one or more pressure-based connectors configured to couple the frame 10 to the structure 17, and that may be further configured to uncouple the frame 10 from the structure 17 when, for example, a predetermined amount of pressure is applied to the panel 22 and/or the frame 10. The pressure-based connectors may include any type of connector that may apply pressure (or otherwise utilize pressure) to couple the frame 10 to the structure 17. As an example, the pressure-based connectors may be a pressure-based clip (such as a spring clip) configured to fit in-between the outer edges 11 of the frame 10 and the edges 19 of the opening 18. In such an example, when the frame 10 is installed into the opening 18, the pressure-based connectors may be compressed by the outer edges 11 of the frame 10 and the edges 19 of the opening 18, thereby causing the pressure-based connectors to push outward against the edges 19 of the opening 18 and inward against the outer edges 11 of the frame 10. Such pressure applied by the pressure-based connectors (along with friction, in particular embodiments) may at least couple the frame 10 to the structure 17. Furthermore, although the pressure-based connectors have been described above as being a separate component from the frame 10, in particular embodiments, the pressure-based connectors may be a part of the frame 10, itself. For example, the pressure-based connectors may be formed integral with (or as a portion of) the frame 10.

The pressure-based connectors may be further configured to uncouple the frame 10 from the structure 17 when, for example, a predetermined amount of pressure is applied to the panel 22 and/or the frame 10. For example, the pressure-based connectors may be configured to break, slip off, or otherwise uncouple from the frame 10 and/or structure 17 when, for example, a predetermined amount of pressure is applied to the panel 22 and/or the frame 10. In particular embodiments, the amount of pressure applied by the pressure-based connectors may be configured to be overcome by the predetermined amount of pressure applied to the panel 22 and/or the frame 10 by, for example, the fluid.

The pressure-based connectors may include one or more pressure-based connectors coupled to (and/or applying pressure to) the frame 10 and/or the structure 17, thereby coupling the frame 10 to the structure 17. Furthermore, the pressure-based connectors may continue to couple the frame 10 to the structure 17 until a predetermined amount of pressure is applied to the panel 22 and/or the frame 10 by, for example, a fluid (such as flooding water). Once the predetermined amount of pressure is applied to the panel 22 and/or the frame 10, the pressure-based connectors may break, slip off, or otherwise uncouple from the frame 10 and/or structure 17. This may uncouple the frame 10 from the structure 17, causing the frame 10 to be completely separated from the structure 17, and be carried away from the structure 17. As such, in particular embodiments, the flood vent 8 may no longer prevent objects and/or fluids from passing through the opening 18 in the structure 17 (or the amount of blockage of the fluid passing through the opening 18 may be reduced).

The flood vent 8 may include any number of connectors 40. For example, the flood vent 8 may include one connector 40, two connectors 40, three connectors 40, four connectors 40, six connectors 40, eight connectors 40, ten connectors 40, or any other number of connectors 40. The connectors 40 may be attached or otherwise coupled to any portion of the frame 10 and/or structure 17 (and/or the panel 22). For example, the connectors 40 may be attached to the edges 11 of the frame 10 and/or the edges 19 of the opening 18 of the structure 17. As another example, the connectors 40 (such as screws) may be positioned through one or more holes (such as one or more screw holes) in rails 12 (for example) of the frame 10, and inserted into one or more holes in the structure 17, thereby coupling the frame 10 to the structure 17. The connectors 40 may be added to (or otherwise be coupled to) the frame 10 (and/or structure 17 and/or the panel 22), the connectors 40 may be formed integral with (or formed as a part of) the frame 10 (and/or the panel 22), or any combination of the preceding.

The connectors 40 may have any size and/or shape that may allow the connectors 40 to uncouple the frame 10 when a predetermined amount of pressure is applied to the panel 22 and/or the frame 10. For example, the length of the connectors 40 (such as one or more mechanical fasteners) may be selected to cause the connectors 40 to break, fail, or otherwise uncouple the frame 10 when the predetermined amount of pressure is applied to the panel 22 and/or the frame 10. The connectors 40 may be formed from any material that may allow the connectors 40 to uncouple the frame 10 when a predetermined amount of pressure is applied to the panel 22 and/or the frame 10. For example, the connectors 40 may be formed from rubber, plastic, a polymer, a foam, a metal (such as aluminum, stainless steel, spring steel, a galvanized material, any other metal, or any combination of the preceding), an adhesive, any other material that may allow the connectors 40 to uncouple the frame 10 when a predetermined amount of pressure is applied to the panel 22 and/or the frame 10, or any combination of the preceding. In particular, the connectors 40 (such as one or more mechanical fasteners) may be formed from a particular plastic (for example) that causes the mechanical fastener to break or fail when the predetermined amount of pressure is applied to the panel 22 and/or the frame 10.

As is discussed above, the connectors 40 may be configured to uncouple the frame 10 from the structure 17 when, for example, a predetermined amount of pressure is applied to the panel 22 and/or the frame 10. In particular embodiments, the predetermined amount of pressure may refer to the lowest amount of pressure (or approximately the lowest amount of pressure) that would cause the panel 22 to prevent the equalization of interior and exterior hydrostatic forces caused by a fluid (such as flooding water) attempting to flow through the flood vent 8. As an example, the predetermined amount of pressure may be 0.5 PSI, 1 PSI, 1.5 PSI, 2 PSI, 2.5 PSI, 3 PSI, 3.5 PSI, 4 PSI, 4.5 PSI, 5 PSI, 6 PSI, 7 PSI, 10 PSI, approximately 0.5 PSI (i.e., 0.5 PSI+/−0.2 PSI), approximately 1 PSI, approximately 1.5 PSI, approximately 2 PSI, approximately 2.5 PSI, approximately 3 PSI, approximately 3.5 PSI, approximately 4 PSI, approximately 4.5 PSI, approximately 5 PSI, approximately 6 PSI, approximately 7 PSI, approximately 10 PSI, or any other amount of pressure that may prevent the equalization of interior and exterior hydrostatic forces caused by a fluid (such as flooding water) attempting to flow through the flood vent 8. As a further example, the predetermined amount of pressure may be a pressure range of 0.5 PSI-7 PSI, 0.5-5.0 PSI, 0.5-4.0 PSI, 0.5-3.0 PSI, 1.0-7.0 PSI, 1.0-5.0 PSI, 1.0-4.0 PSI, 1.0-3.0 PSI, 1.5-7.0 PSI, 1.5-5.0 PSI, 1.5-4.0 PSI, 1.5-3.0 PSI, 2.0-7.0 PSI, 2.0-5.0 PSI, 2.0-4.0 PSI, 2.0-3.0 PSI, or any other pressure range that may prevent the equalization of interior and exterior hydrostatic forces caused by a fluid (such as flooding water) attempting to flow through the flood vent 8.

In particular embodiments, the predetermined amount of pressure may be the lowest pressure at which the connectors 40 may be configured to uncouple the frame 10 from the structure 17. For example, if an amount of pressure below the predetermined amount of pressure is applied to the panel 22 and/or the frame 10, the connectors 40 may not uncouple the frame 10 from the structure 17. On the other hand, if an amount of pressure equal to the predetermined amount of pressure (or above the predetermined amount of pressure) is applied to the panel 22 and/or the frame 10, the connectors 40 may uncouple the frame 10 from the structure 17.

In particular embodiments, the connectors 40 may be configured to uncouple the frame 10 from the structure 17 if the predetermined amount of pressure is applied to any portion of the panel 22 and/or frame 10. For example, the connectors 40 may be configured to uncouple the frame 10 from the structure 17 if the predetermined amount of pressure is applied to a bottom portion of the panel 22 (and/or the frame 10), a top portion of the panel 22 (and/or the frame 10), a left and/or right side portion of the panel 22 (and/or the frame 10), any other portion of the panel 22 (and/or the frame 10), or any combination of the preceding. In particular embodiments, the predetermined amount of pressure for causing the connectors 40 to uncouple the frame 10 from the structure 17 may change based on (or be a function of) the portion of the panel 22 (and/or the frame 10) to which the predetermined amount of pressure is applied. For example, the predetermined amount of pressure may be greater if the predetermined amount of pressure is applied to the bottom portion of the panel 22 (and/or the frame 10) (which may be indicative of a less amount of flooding fluids, for example) than if the predetermined amount of pressure is applied to the top portion of the panel 22 (and/or the frame 10) (which may be indicative of a greater amount of flooding fluids, for example). In particular embodiments, the predetermined amount of pressure for causing the connectors 40 to uncouple the frame 10 from the structure 17 may change based on (or be a function of) the type of panel 22 included in the flood vent 8. For example, the predetermined amount of pressure may be less if the panel 22 is a panel without any openings 26 (or with openings 26 that may be closed, using louvers, for example) than if the panel 22 includes openings 26 that may not be closed (or if the panel 22 is a screen). In such an example, a panel 22 without openings 26 (when compared to a panel 22 with openings 26) may more easily (or quickly) prevent equalization of interior and exterior hydrostatic forces caused by a fluid, and therefore it may be advantageous to uncouple the panel 22 without openings 26 at a lower amount of pressure (when compared to a panel 22 with openings 26). As another example, the predetermined amount of pressure may be less if the panel 22 is a panel with less openings 26 (and/or with smaller openings 26) than if the panel 22 includes more openings 26 (and/or has bigger openings 26). In such an example, a panel 22 with less openings 26 (when compared to a panel 22 with more openings 26) may more easily (or quickly) prevent equalization of interior and exterior hydrostatic forces caused by a fluid, and therefore it may be advantageous to uncouple the panel 22 with less openings 26 at a lower amount of pressure (when compared to a panel 22 with more openings 26).

In particular embodiments, the connectors 40 may be configured to uncouple the panel 22 from the frame if the predetermined amount of pressure is applied to any side of the panel 22. For example, the connectors 40 may be configured to uncouple the panel 22 from the frame if the predetermined amount of pressure is applied to side 24b of the panel 22 (e.g., the side of the panel 22 facing the interior of the structure 17), thereby causing the frame 10 to be uncoupled from the structure 17 and be carried by the fluids, for example, outside of the structure 17, as is illustrated in FIGS. 4A-4C. In particular embodiments, this may cause the frame 10 to be uncoupled from the structure 17 when flooding fluids, for example, enter the flood vent 8 from inside the structure 17. As another example, the connectors 40 may be configured to uncouple the frame 10 from the structure 17 if the predetermined amount of pressure is applied to side 24a the panel 22 (e.g., the side of the panel 22 facing the exterior of the structure 17), thereby causing the frame 10 to be uncoupled from the structure 17 and be carried by the fluids, for example, inside of the structure 17 (e.g., in a direction from left-to-right in FIGS. 4A-4C). In particular embodiments, this may cause the frame 10 to be uncoupled from the structure 17 when flooding fluids, for example, enter the flood vent 8 from outside the structure 17. Furthermore, in such embodiments, the frame 10 may not include rails 12 that may prevent the frame 10 from being carried inside of the structure 17. As a further example, the connectors 40 may be configured to uncouple the frame 10 from the structure 17 if the predetermined amount of pressure is applied to either the side 24b of the panel 22 (e.g., the side of the panel 22 facing the interior of the structure 17) or the side 24a of the panel 22 (e.g., the side of the panel 22 facing the exterior of the structure 17). In particular embodiments, this may cause the frame 10 to be uncoupled from the structure 17 when flooding fluids, for example, enter the flood vent 8 from either inside the structure 17 or outside the structure 17.

Modifications, additions, or omissions may be made to the flood vent 8 of FIGS. 4A-4C without departing from the scope of the disclosure. For example, the flood vent 8 of FIGS. 4A-4C may include one or more components of the flood vent 8 of FIGS. 3A-3C. In such an example, the flood vent 8 may include one or more connectors 30 that may be configured to uncouple the panel 22 from the frame 10 (and/or the structure 17) when a first predetermined amount of pressure is applied to the panel 22 (as is discussed above with regard to FIGS. 3A-3C), and may further include one or more connectors 40 that may be configured to uncouple the frame 10 from the structure 17 when a second predetermined amount of pressure is applied to the panel 22 and/or the frame 10. The first predetermined amount of pressure (which may uncouple the panel 22 from the frame 10 and/or structure 17) may be less than the second predetermined amount of pressure (which may uncouple the frame 10 from the structure 17). For example, the first predetermined amount of pressure may be a pressure range of 0.5 PSI-7 PSI (or any of the pressures or pressure ranges discussed above) while the second predetermined amount of pressure may be a pressure range of 1.5 PSI-8 PSI (or any of the pressures or pressure ranges discussed above and further being greater than the first predetermined amount of pressure). As such, if a fluid (such as flooding water) applies a first predetermined amount of pressure to the panel 22, the panel 22 may be uncoupled from the frame 10 and/or the structure (which may reduce the amount of blockage of the fluid passageway provided by the panel 22). Furthermore, in an example where the fluid (such as the flooding water) continues to rise and apply additional force, if the fluid applies the second predetermined amount of pressure to the frame 10 (and/or the remainder of the panel 22, if any), the frame 10 may be uncoupled from the structure 17 (which may further reduce the amount of blockage of the fluid). As such, the flood vent 8 may be able to further provide for equalization of interior and exterior hydrostatic forces caused by flooding waters.

FIGS. 5A-6C illustrate the flood vent 8 of FIGS. 1-2 with a panel 22 having example perforations 60. Perforations 60 may be configured to uncouple at least a portion of the panel 22 from the flood vent 8. For example, the perforations 60 may be configured to uncouple at least a portion of the panel 22 from the flood vent 8 when a predetermined amount of pressure is applied to the panel 22, such as by a fluid or an object (such as a tree limb or dirt) carried by the fluid. As such, in particular embodiments, the panel 22 of flood vent 8 may prevent (or substantially prevent) objects and/or fluids from passing through the flood vent 8 until a predetermined amount of pressure is applied to the panel 22, and after the predetermined amount of pressure is applied to the panel 22, the at least a portion of the panel 22 may be uncoupled from the flood vent 8 and may no longer prevent objects and/or fluids from passing through the flood vent 8 (or the amount of blockage of the fluid passageway provided by the panel 22 may be reduced). This may, in particular embodiments, allow the flood vent 8 to provide for equalization of hydrostatic forces caused by, for example, flooding fluids, even when the flooding fluids carry objects (such as debris) that may clog the openings 26 in the panel 22, when the openings 26 in the panel 22 are too small to allow sufficient fluids to pass through the flood vent 8, when the openings 26 in the panel are closed, and/or when the panel 22 does not include any openings 26.

Figure 5A:
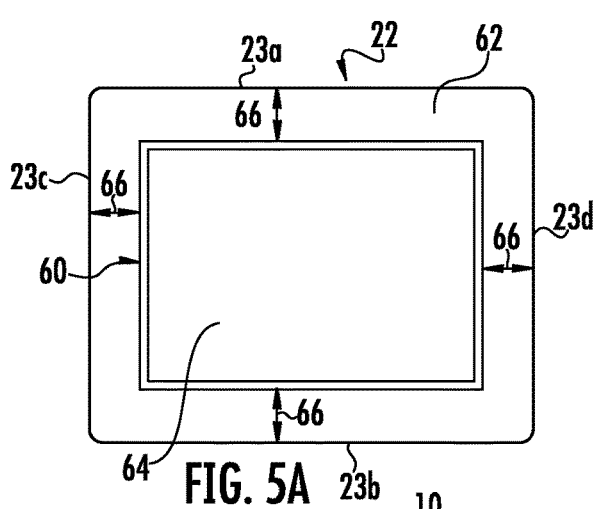
FIGS. 5A-6C illustrate the flood vent of FIGS. 1-2 with a panel having example perforations.
Figure 5B:
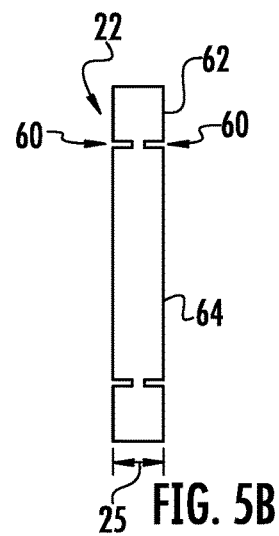
Figure 5C:
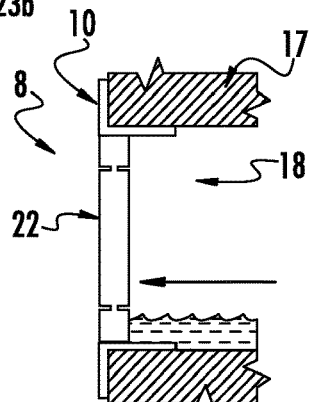
Figure 5D:
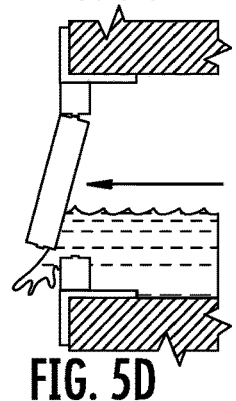
Figure 5E:
Figure 6A:
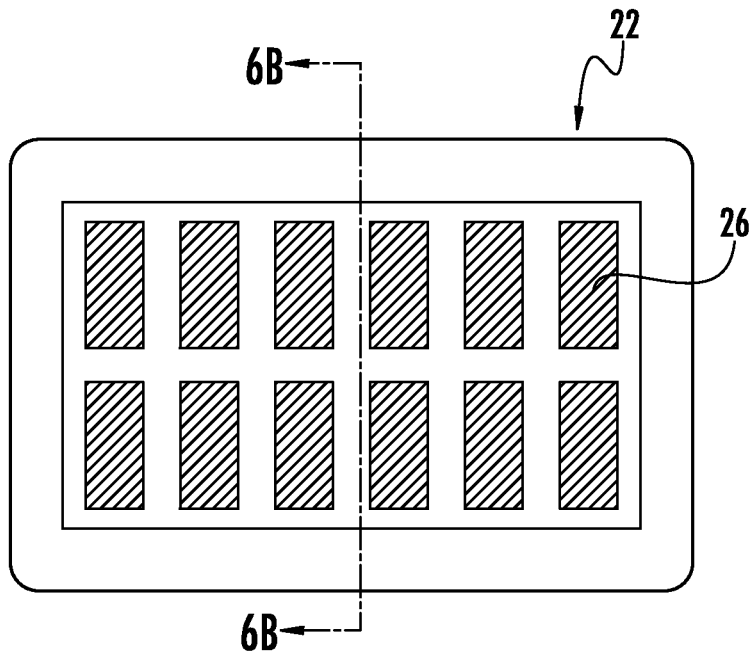
Figure 6B:
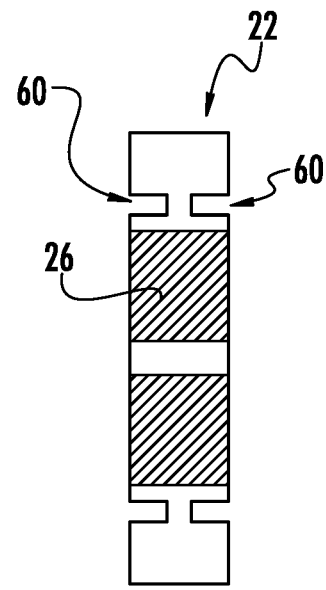

As is discussed above with regard to FIGS. 1-2, the flood vent 8 includes a frame 10 and a panel 22. The frame 10 may be configured to be inserted into an opening 18 in a structure 17, and may be further configured to form a fluid passageway through the opening 18 in the structure 17, thereby allowing the flooding fluids to enter and/or exit the structure 17. The panel 22 may be configured to be coupled to the frame 10. Furthermore, the panel 22 may be configured to be coupled to the frame 10 in the fluid passageway formed by the frame 10. Additionally, when coupled to the frame 10, the panel 22 may at least partially block the fluid passageway formed by the frame 10, an example of which is seen in FIG. 5C. The panel 22 may be coupled to the frame 10 in any manner. For example, the panel 22 may be formed integral with the frame 10, welded to the frame 10, coupled to the frame 10 using an adhesive (such as glue, cement, and/or Lexel®), attached to the frame 10 using one or more pins that may be inserted or snapped into one or more channels or hooks in the frame 10, attached to the frame 10 using one or more rivets, nails, and/or any other connector, attached to the structure 17 (and thus the frame 10) using one or more rivets, nails, and/or any other connector, coupled to the frame 10 in any other manner, or any combination of the preceding. The panel 22 may be any type of panel. For example, as is illustrated in FIGS. 5A-5E, the panel 22 may be a solid panel that may prevent all (or substantially all) fluids (such as water and/or air) from passing through the panel 22, as well as prevent (or substantially prevent) objects (such as small animals) from passing through the panel 22. As another example, as is illustrated in FIGS. 6A-6B, the panel 22 may include one or more openings 26 configured to allow fluids (such as water and/or air) to pass through the panel 22, but prevent objects (such as small animals) from passing through the panel 22.

As illustrated, the panel 22 includes one or more perforations 60 configured to uncouple at least a portion of the panel 22 from the flood vent 8 when, for example, a predetermined amount of pressure is applied to the panel 22, such as by a fluid or an object (such as a tree limb or dirt) carried by the fluid. A perforation 60 may be any type of characteristic or feature of the panel 22 that may uncouple at least a portion of the panel 22 from the flood vent 8 when, for example, a predetermined amount of pressure is applied to the panel 22. For example, a perforation 60 may be any type of reduction in the thickness 25 (or any other dimension) of the panel 22 at one or more points on the panel 22, which may cause the panel 22 to break or fail at the perforation 60 when, for example, a predetermined amount of pressure is applied to the panel 22. In such an example, a perforation 60 may be a cut-out of the material of the panel 22 (as is illustrated in FIG. 5B), a stamp in the material of the panel 22, one or more channels in the panel 22, any other feature that may reduce the thickness 25 (or any other dimension) of the panel 22 at one or more points on the panel 22, or any combination of the preceding. As another example, a perforation 60 may be one or more holes (or one or more rows of holes) in the panel 22, which may cause the panel 22 to break or fail at the perforation 60 when, for example, a predetermined amount of pressure is applied to the panel 22. As a further example, a perforation 60 may be a pre-stressed portion (or weak portion) of the panel 22, which may cause the panel 22 to break or fail at the perforation 60 when, for example, a predetermined amount of pressure is applied to the panel 22. As another example, a perforation 60 may be a pre-cut portion of the panel 22, which may cause the panel 22 to break or fail at the perforation 60 when, for example, a predetermined amount of pressure is applied to the panel 22. As a further example, a perforation 60 may be a combination of one or more (or all of) a reduction in the thickness 25 (or any other dimension) of the panel 22 at one or more points on the panel 22, one or more holes (or one or more rows of holes) in the panel 22, a pre-stressed portion (or weak portion) of the panel 22, a pre-cut portion of the panel 22, or any other characteristic or feature of the panel 22 that may uncouple at least a portion of the panel 22 from the flood vent 8.

The perforations 60 may be configured to uncouple any portion of the panel 22 from the flood vent 8. As a first example, the perforations 60 may be positioned so as uncouple the entire panel 22 from the frame 10. In such an example, the perforations 60 may positioned at any location that couples the panel 22 to the frame 10, such as at the edges 23 of the panel 22. The perforations 60 may couple the panel 22 to the frame 10 until a predetermined amount of pressure is applied to the panel 22 by, for example, a fluid (such as flooding water). Once the predetermined amount of pressure is applied to the panel 22, the perforations 60 may break or fail. This may uncouple the panel 22 from the frame 10, causing the panel 22 to be completely separated from the frame 10, and be carried away from the frame 10. As such, in particular embodiments, the flood vent 8 may no longer prevent objects and/or fluids from passing through the opening 18 in the structure 17 (or the amount of blockage of the fluid passageway provided by the panel 22 may be reduced).

As a second example, the perforations 60 may be positioned so as uncouple a portion of the panel 22 from another portion of the panel 22. For example, as is illustrated in FIGS. 5A-5E, the panel 22 may include a first portion 62 of the panel 22 and a second portion 64 of the panel 22. Furthermore, perforations 60 may be located in-between the first portion 62 and the second portion 64. As such, the perforations 60 (and/or the area that includes the perforations 60) may couple the second portion 64 to the first portion 62 of the panel 22 until a predetermined amount of pressure is applied to the panel 22 (such as the second portion 64 of the panel) by, for example, a fluid (such as flooding water). Once the predetermined amount of pressure is applied to the panel 22, the perforations 60 may break or fail. This break or failure may uncouple the second portion 64 of the panel 22 from the first portion 62 of the panel 22, causing the second portion 64 to be completely separated from the first portion 62, and be carried away from the first portion 62, as is illustrated in FIGS. 5C-5E. As such, in particular embodiments, the flood vent 8 may no longer prevent objects and/or fluids from passing through the opening 18 in the structure 17 (or the amount of blockage of the fluid passageway provided by the panel 22 may be reduced).

The first portion 62 of the panel 22 may include any area of the panel 22, and the second portion 64 of the panel 22 may include any area of the panel. As one example, the first portion 62 of the panel 22 may be an outer area of the panel 22, and the second portion of the panel 22 may be an inner area of the panel 22 that is surrounded (at least partially) be the outer area of the panel 22, as is illustrated in FIGS. 5A-5B. As another example, the first portion 62 of the panel 22 may be an inner area of the panel 22, and the second portion of the panel 22 may be an outer area of the panel 22 that surrounds (at least partially) the inner area of the panel 22. As another example, the first portion 62 of the panel 22 may be a left-side area (or a right-side area, or a top-side area, or a bottom-side area) of the panel 22, and the second portion of the panel 22 may be a right-side area (or a left-side area, or a top-side area, or a bottom-side area) of the panel 22. The first portion 62 of the panel 22 may be any type of panel, and the second portion 64 of the panel 22 may be any type of panel. For example, the first portion 62 of the panel 22 may be a solid panel, and the second portion 64 of the panel 22 may include one or more openings 26, as is illustrated in FIGS. 6A-6B. As another example, the first portion 62 of the panel 22 may be a solid panel, and the second portion 64 of the panel 22 may be a screen. As a further example, both the first portion 62 and the second portion 64 of the panel 22 may be solid panels, screens, or panels with one or more openings 26.

The perforations 60 may be located at any position on the panel 22. In particular embodiments, the location of the perforations 60 may be based on the edges 23 of the panel 22. For example, the perforations 60 (or the portions of a perforation 60) may be located a perforation distance 66 from the respective edges 23. The perforation distance 66 may be any distance, such as 0.15", 0.25", 0.5", 0.75", 1", 1.5", 2", 3", 4", less than 0.5", less than 0.75", less than 1", less than 1.5", less than 2", less than 3", less than 4", or any other distance. The perforation distance 66 may be the same for each perforation 60 (or for each portion of a perforation 60), or the perforation distance 66 may be different for one or more of the perforations 60 (or for one or more portions of a perforation 60).

Figure 6C:
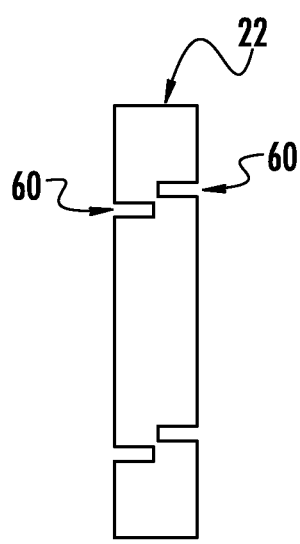

The flood vent 8 may include any number of perforations 60. For example, the flood vent 8 may include one perforation 60, two perforations 60, three perforations 60, four perforations 60, six perforations 60, eight perforations 60, ten perforations 60, or any other number of perforations 60. The perforations 60 may be included on a single side of the panel 22 (such as side 24a of the panel 22 or side 24b of the panel 22) or may be included on both sides of the panel 22 (such as on both sides 24a and 24b of the panel 22). Furthermore, when perforations 60 are included on both sides of the panel 22, the perforations 60 may be located in the same location of the panel 22 on both sides of the panel 22 (as is illustrated in FIGS. 5B and 6B), or the perforations 60 may be located in different locations of the panel 22 (or otherwise be off-center from each other), as is illustrated in FIG. 6C. The perforations 60 may be positioned in any pattern on the panel 22. For example, the perforations 60 may completely surround the portion of the panel 22 that is uncoupled from the flood vent 8, as is illustrated in FIGS. 5A-5E. As another example, the perforations 60 may at least substantially surround the portion of the panel 22 that is uncoupled from the flood vent 8 (i.e., the perforations 60 may surround at least 90% of the portion of the panel 22 that is uncoupled from the flood vent 8). As a further example, the perforations 60 may surround any other amount of the portion of the panel 22, so as to cause the portion of the panel 22 to be uncoupled from the flood vent 8 when a predetermined amount of pressure is applied to the panel 22.

The perforations 60 may have any size and/or shape that may allow the perforations 60 to uncouple at least a portion of the panel 22 when a predetermined amount of pressure is applied to the panel 22. For example, the perforations 60 may be sized and/or shaped to reduce the thickness 25 of the panel 22 at one or more points of the panel 22 to a thickness that is less than the other portions of the panel 22. For example, if the thickness 25 of the panel 22 is, for example, 1 inch, the perforations 60 may have a reduced thickness, such as, for example, 0.75 inches, 0.5 inches, 0.4 inches, 0.33 inches, 0.3 inches, 0.25 inches, 0.2 inches. 0.1 inches, approximately 0.75 inches (i.e., 0.75 inches+/−0.1 inches), approximately 0.5 inches, approximately 0.4 inches, approximately 0.33 inches, approximately 0.3 inches, approximately 0.25 inches, approximately 0.2 inches, or any other thickness less than 1 inch. In particular embodiments, the reduction in the thickness 25 of the panel 22 at one or more points of the panel 22 may be selected to cause at least a portion of the panel 22 to uncouple from the flood vent 8 when a predetermined amount of pressure is applied to the panel 22.

As is discussed above, the perforations 60 may be configured to uncouple at least a portion of the panel 22 from the flood vent 8 when, for example, a predetermined amount of pressure is applied to the panel 22. In particular embodiments, the predetermined amount of pressure may refer to the lowest amount of pressure (or approximately the lowest amount of pressure) that would cause the panel 22 to prevent the equalization of interior and exterior hydrostatic forces caused by a fluid (such as flooding water) attempting to flow through the flood vent 8. As an example, the predetermined amount of pressure may be 0.5 PSI, 1 PSI, 1.5 PSI, 2 PSI, 2.5 PSI, 3 PSI, 3.5 PSI, 4 PSI, 4.5 PSI, 5 PSI, 6 PSI, 7 PSI, 10 PSI, approximately 0.5 PSI (i.e., 0.5 PSI+/−0.2 PSI), approximately 1 PSI, approximately 1.5 PSI, approximately 2 PSI, approximately 2.5 PSI, approximately 3 PSI, approximately 3.5 PSI, approximately 4 PSI, approximately 4.5 PSI, approximately 5 PSI, approximately 6 PSI, approximately 7 PSI, approximately 10 PSI, or any other amount of pressure that may prevent the equalization of interior and exterior hydrostatic forces caused by a fluid (such as flooding water) attempting to flow through the flood vent 8. As a further example, the predetermined amount of pressure may be a pressure range of 0.5 PSI-7 PSI, 0.5-5.0 PSI, 0.5-4.0 PSI, 0.5-3.0 PSI, 1.0-7.0 PSI, 1.0-5.0 PSI, 1.0-4.0 PSI, 1.0-3.0 PSI, 1.5-7.0 PSI, 1.5-5.0 PSI, 1.5-4.0 PSI, 1.5-3.0 PSI, 2.0-7.0 PSI, 2.0-5.0 PSI, 2.0-4.0 PSI, 2.0-3.0 PSI, or any other pressure range that may prevent the equalization of interior and exterior hydrostatic forces caused by a fluid (such as flooding water) attempting to flow through the flood vent 8.

In particular embodiments, the predetermined amount of pressure may be the lowest pressure at which the perforations 60 may be configured to uncouple at least a portion of the panel 22 from the flood vent 8. For example, if an amount of pressure below the predetermined amount of pressure is applied to the panel 22, the perforations 60 may not uncouple at least a portion of the panel 22 from the flood vent 8. On the other hand, if an amount of pressure equal to the predetermined amount of pressure (or above the predetermined amount of pressure) is applied to the panel 22, the perforations 60 may uncouple at least a portion of the panel 22 from the flood vent 8.

In particular embodiments, the perforations 60 may be configured to uncouple at least a portion of the panel 22 from the flood vent 8 if the predetermined amount of pressure is applied to any portion of the panel 22. For example, the perforations 60 may be configured to uncouple at least a portion of the panel 22 from the flood vent 8 if the predetermined amount of pressure is applied to a bottom portion of the panel 22 (or a bottom portion of second portion 64), a top portion of the panel 22 (or a top portion of second portion 64), a left and/or right side portion of the panel 22 (or a left and/or right side portion of second portion 64), any other portion of the panel 22, or any combination of the preceding. In particular embodiments, the predetermined amount of pressure for causing the perforations 60 to uncouple at least a portion of the panel 22 from the flood vent 8 may change based on (or be a function of) the portion of the panel 22 to which the predetermined amount of pressure is applied. For example, the predetermined amount of pressure may be greater if the predetermined amount of pressure is applied to the bottom portion of the panel 22 (or a bottom portion of second portion 64) (which may be indicative of a less amount of flooding fluids, for example) than if the predetermined amount of pressure is applied to the top portion of the panel 22 (or a top portion of second portion 64) (which may be indicative of a greater amount of flooding fluids, for example). In particular embodiments, the predetermined amount of pressure for causing the perforations 60 to uncouple at least a portion of the panel 22 from the flood vent 8 may change based on (or be a function of) the type of panel 22 included in the flood vent 8. For example, the predetermined amount of pressure may be less if the panel 22 is a panel without any openings 26 (or with openings that may be closed, using louvers, for example) than if the panel includes openings 26 that may not be closed (or if the panel 22 is a screen). In such an example, a panel 22 without openings 26 (when compared to a panel 22 with openings 26) may more easily (or quickly) prevent equalization of interior and exterior hydrostatic forces caused by a fluid, and therefore it may be advantageous to uncouple the panel 22 without openings 26 at a lower amount of pressure (when compared to a panel 22 with openings 26). As another example, the predetermined amount of pressure may be less if the panel 22 is a panel with less openings 26 (and/or with smaller openings 26) than if the panel 22 includes more openings 26 (and/or has bigger openings 26). In such an example, a panel 22 with less openings 26 (when compared to a panel 22 with more openings 26) may more easily (or quickly) prevent equalization of interior and exterior hydrostatic forces caused by a fluid, and therefore it may be advantageous to uncouple the panel 22 with less openings 26 at a lower amount of pressure (when compared to a panel 22 with more openings 26).

In particular embodiments, the perforations 60 may be configured to uncouple the at least a portion of the panel 22 from the flood vent 8 if the predetermined amount of pressure is applied to any side of the panel 22. For example, the perforations 60 may be configured to uncouple at least a portion of the panel 22 from the flood vent 8 if the predetermined amount of pressure is applied to side 24b of the panel 22 (e.g., the side of the panel 22 facing the interior of the structure 17), thereby causing at least a portion of the panel 22 to be uncoupled from the flood vent 8 and be carried by the fluids, for example, outside of the structure 17, as is illustrated in FIGS. 5C-5E. In particular embodiments, this may cause the at least a portion of the panel 22 to be uncoupled from the flood vent 8 when flooding fluids, for example, enter the flood vent 8 from inside the structure 17. As another example, the perforations 60 may be configured to uncouple at least a portion of the panel 22 from the flood vent 8 if the predetermined amount of pressure is applied to side 24a the panel 22 (e.g., the side of the panel 22 facing the exterior of the structure 17), thereby causing at least a portion of the panel 22 to be uncoupled from the flood vent 8 and be carried by the fluids, for example, inside of the structure 17 (e.g., in a direction from left-to-right in FIGS. 5C-5E). In particular embodiments, this may cause at least a portion of the panel 22 to be uncoupled from the flood vent 8 when flooding fluids, for example, enter the flood vent 8 from outside the structure 17. As a further example, the perforations 60 may be configured to uncouple at least a portion of the panel 22 from the flood vent 8 if the predetermined amount of pressure is applied to either the side 24b of the panel 22 (e.g., the side of the panel 22 facing the interior of the structure 17) or the side 24a of the panel 22 (e.g., the side of the panel 22 facing the exterior of the structure 17). In particular embodiments, this may cause at least a portion of panel 22 to be uncoupled from the flood vent 8 when flooding fluids, for example, enter the flood vent 8 from either inside the structure 17 or outside the structure 17.

Modifications, additions, or omissions may be made to the flood vent 8 of FIGS. 5A-6C without departing from the scope of the disclosure. For example, the flood vent 8 of FIGS. 5A-6C may include one or more components of the flood vent 8 of FIGS. 3A-3C and/or FIGS. 4A-4C. In such an example, the flood vent 8 may include a panel 22 having one or more perforations 60 that may be configured to uncouple at least a portion of the panel 22 from the flood vent 8 when a first predetermined amount of pressure is applied to the panel 22, may further include one or more connectors 30 that may be configured to uncouple the panel 22 from the frame 10 (and/or the structure 17) when a second predetermined amount of pressure is applied to the panel 22 (as is discussed above with regard to FIGS. 3A-3C), and/or may further include one or more connectors 40 that may be configured to uncouple the frame 10 from the structure 17 when a third predetermined amount of pressure is applied to the panel 22 and/or the frame 10 (as is discussed above with regard to FIGS. 4A-4C). The first predetermined amount of pressure (which may uncouple at least a portion of the panel 22 from the flood vent 8) may be less than the second predetermined amount of pressure (which may uncouple the remainder of the panel 22 from the frame 10), and the second predetermined amount of pressure may be less than the third predetermined amount of pressure (which may uncouple the frame 10 from the structure 17). For example, the first predetermined amount of pressure may be a pressure range of 0.5 PSI-7 PSI (or any of the pressures or pressure ranges discussed above), the second predetermined amount of pressure may be a pressure range of 1.5 PSI-8 PSI (or any of the pressures or pressure ranges discussed above and further being greater than the first predetermined amount of pressure), and the third predetermined amount of pressure may be a pressure range of 2.5 PSI-9 PSI (or any of the pressures or pressure ranges discussed above and further being greater than the second predetermined amount of pressure). As such, if a fluid (such as flooding water) applies a first predetermined amount of pressure to the panel 22, at least a portion of the panel 22 may be uncoupled from the flood vent 8 (which may reduce the amount of blockage of the fluid passageway provided by the panel 22). Furthermore, in an example where the fluid (such as the flooding water) continues to rise and apply additional force, if the fluid applies the second predetermined amount of pressure to the remainder of the panel 22, the remainder of the panel 22 may be uncoupled from the frame 10 (which may further reduce the amount of blockage of the fluid). Additionally, in an example where the fluid (such as the flooding water) continues to rise and apply additional force, if the fluid applies the third predetermined amount of pressure to the frame 10, the frame 10 may be uncoupled from the structure 17 (which may further reduce the amount of blockage of the fluid). As such, the flood vent 8 may be able to further provide for equalization of interior and exterior hydrostatic forces caused by flooding waters.

As another example, the flood vent 8 of FIGS. 5A-6C may include a panel 22 having more than one portion of the panel 22 that may be uncoupled from the flood vent 8. In such an example, the panel 22 may include three or more portions separated by two or more perforations 60. For example, the panel 22 may have a first portion separated from a second portion by a first perforation 60 configured to uncouple the second portion from the first portion when a second predetermined amount of pressure is applied to the panel 22 (or to the second portion of the panel 22). Furthermore, the second portion of the panel 22 may be separated from a third portion of the panel 22 by a second perforation configured to uncouple the third portion from the second portion when a first predetermined amount of pressure is applied to the panel 22 (or to the third portion of the panel 22). The first predetermined amount of pressure (which may uncouple the third portion of the panel 22 from the flood vent 8) may be less than the second predetermined amount of pressure (which may uncouple the second portion of the panel 22 from the flood vent 8). For example, the first predetermined amount of pressure may be a pressure range of 0.5 PSI-7 PSI (or any of the pressures or pressure ranges discussed above) while the second predetermined amount of pressure may be a pressure range of 1.5 PSI-8 PSI (or any of the pressures or pressure ranges discussed above and further being greater than the first predetermined amount of pressure). As such, if a fluid (such as flooding water) applies a first predetermined amount of pressure to the panel 22, the third portion may be uncoupled from the flood vent 8 (which may reduce the amount of blockage of the fluid passageway provided by the panel 22). Furthermore, in an example where the fluid (such as the flooding water) continues to rise and apply additional force, if the fluid applies the second predetermined amount of pressure to the remainder of the panel 22, the second portion of the panel 22 may be uncoupled from the flood vent 8 (which may further reduce the amount of blockage of the fluid passageway provided by the panel 22). As such, the flood vent 8 may be able to further provide for equalization of interior and exterior hydrostatic forces caused by flooding waters.

As a further example, although the flood vent 8 has been described above as including a frame 10, in particular embodiments, the flood vent 8 may not include a frame 10. In such embodiments, the panel 22 may be configured to be coupled directly to the structure 17. As such, in particular embodiments, the panel 22 may be inserted into (or installed on) the structure 17 (such as the opening 18 in the structure 17) without the use of a frame 10.

FIGS. 7A-7H illustrate the flood vent 8 of FIGS. 1-2 with a panel 22 having a plurality of insulation pieces 70 and one or more insulation piece connectors 80. The insulation pieces 70 may be configured to form the panel 22, so as to at least partially block the fluid passageway formed by the frame 10. The insulation piece connectors 80 may be configured to couple the insulation pieces 70 together to form the panel 22. Furthermore, the insulation piece connectors 80 may be further configured to uncouple one or more of the insulation pieces 70 from the panel 22. For example, the insulation piece connectors 80 may be configured to uncouple one or more of the insulation pieces 70 from the panel 22 when a predetermined amount of pressure is applied to the panel 22, such as by a fluid or an object (such as a tree limb or dirt) carried by the fluid. As such, in particular embodiments, the panel 22 of flood vent 8 may prevent (or substantially prevent) objects and/or fluids from passing through the flood vent 8 until a predetermined amount of pressure is applied to the panel 22, and after the predetermined amount of pressure is applied to the panel 22, one or more of the insulation pieces 70 of the panel 22 may be uncoupled from the panel 22 and may no longer prevent objects and/or fluids from passing through the flood vent 8 (or the amount of blockage of the fluid passageway provided by the panel 22 may be reduced). This may, in particular embodiments, allow the flood vent 8 to provide for equalization of hydrostatic forces caused by, for example, flooding fluids, even when the flooding fluids carry objects (such as debris) that may clog the openings 26 in the panel 22, when the openings 26 in the panel 22 are too small to allow sufficient fluids to pass through the flood vent 8, when the openings 26 in the panel 22 are closed, and/or when the panel 22 does not include any openings 26.

As is discussed above with regard to FIGS. 1-2, the flood vent 8 includes a frame 10 and a panel 22. The frame 10 may be configured to be inserted into an opening 18 in a structure 17, and may be further configured to form a fluid passageway through the opening 18 in the structure 17, thereby allowing the flooding fluids to enter and/or exit the structure 17. The panel 22 may be configured to be coupled to the frame 10. Furthermore, the panel 22 may be configured to be coupled to the frame 10 in the fluid passageway formed by the frame 10. Additionally, when coupled to the frame 10, the panel 22 may at least partially block the fluid passageway formed by the frame 10, an example of which is seen in FIG. 7C. The panel 22 may be coupled to the frame 10 in any manner. For example, the panel 22 may be coupled to the frame 10 using an adhesive (such as glue, cement, and/or Lexel®), attached to the frame 10 using one or more pins that may be inserted or snapped into one or more channels or hooks in the frame 10, attached to the frame 10 using one or more rivets, nails, and/or any other connector, attached to the structure 17 (and thus the frame 10) using one or more rivets, nails, and/or any other connector, coupled to the frame 10 in any other manner, or any combination of the preceding. The panel 22 may be any type of panel. For example, as is illustrated in FIGS. 7A-7F, the panel 22 may be a solid panel that may prevent all (or substantially all) fluids (such as water and/or air) from passing through the panel 22, as well as prevent (or substantially prevent) objects (such as small animals) from passing through the panel 22. As another example, the panel 22 may include one or more openings 26 configured to allow fluids (such as water and/or air) to pass through the panel 22, but prevent objects (such as small animals) from passing through the panel 22.

The panel 22 includes a plurality of insulation pieces 70 configured to be coupled together to form the panel 22, so as to at least partially block the fluid passageway formed by the frame 10. An insulation piece 70 may be any type of object or piece that may be coupled together with other objects or pieces in order to form a panel 22, and that may be configured to at least partially prevent fluids (such as water and/or air) from passing through the insulation piece 70. An insulation piece 70 may be formed from (or include) any type of material configured to at least partially prevent fluids (such as water and/or air) from passing through the insulation piece 70. For example, insulation piece 70 may be formed from (or include) rubber, plastic, a polymer, a foam, a metal (such as aluminum, stainless steel, spring steel, a galvanized material, any other metal, or any combination of the preceding), any other insulating material, any other material configured to at least partially prevent fluids (such as water and/or air) from passing through insulation piece 70, or any combination of the preceding. In particular embodiments, insulation piece 70 may be formed from (or include) a foam insulation, such as polyurethane, polyisocyanurate, polystyrene, polyethylene (such as cross linked polyethylene), icynene, air krete, teflon (PTFE), polyester, synthetic rubber, any other foam insulation, or any combination of the preceding. In particular embodiments, insulation piece 70 may be formed from (or include) a rubber or polymer, such as butyl, natural rubber, nitrile, ethylene propylene, polyurethane, silicone, any other rubber or polymer, or any combination of the preceding.

The panel 22 may include any number of insulation pieces 70. For example, the panel 22 may include two insulation pieces 70, three insulation pieces 70, four insulation pieces 70, ten insulation pieces 70, twenty insulation pieces 70, forty insulation pieces 70, fifty insulation pieces 70, 64 insulation pieces 70, 75 insulation pieces 70, 98 insulation pieces 70, 100 insulation pieces 70, 128 insulation pieces 70, 150 insulation pieces, 200 insulation pieces, 256 insulation pieces, or any other number of insulation pieces 70. As another example, the panel 22 may include at least two insulation pieces 70 (i.e., two or more insulation pieces 70), at least three insulation pieces 70, at least four insulation pieces 70, at least ten insulation pieces 70, at least twenty insulation pieces 70, at least forty insulation pieces 70, at least fifty insulation pieces 70, at least 64 insulation pieces 70, at least 75 insulation pieces 70, at least 100 insulation pieces 70, at least 128 insulation pieces 70, at least 150 insulation pieces, at least 200 insulation pieces, or at least 256 insulation pieces. As another example, the panel 22 may include a range of insulation pieces 70, such as 2-10 insulation pieces 70, 10-20 insulation pieces 70, 10-50 insulation pieces 70, 50-100 insulation pieces 70, 64-128 insulation pieces 70, 100-256 insulation pieces 70, or any other range of insulation pieces 70.

An insulation piece 70 may have any size and/or shape. For example, an insulation piece 70 may have a height 72 of 0.15", 0.25", 0.50", 1.0" 1.50", 2.0", 3.0" 4.0", or any other height 72. As another example, an insulation piece 70 may have a length 74 of 0.15", 0.25", 0.50", 1.0" 1.50", 2.0", 3.0" 4.0", or any other length 74. As a further example, an insulation piece 70 may have a thickness 76 of 0.15", 0.25", 0.50", 1.0" 1.50", 2.0", 3.0" 4.0", or any other thickness 76.

Figures 7A, 7B:
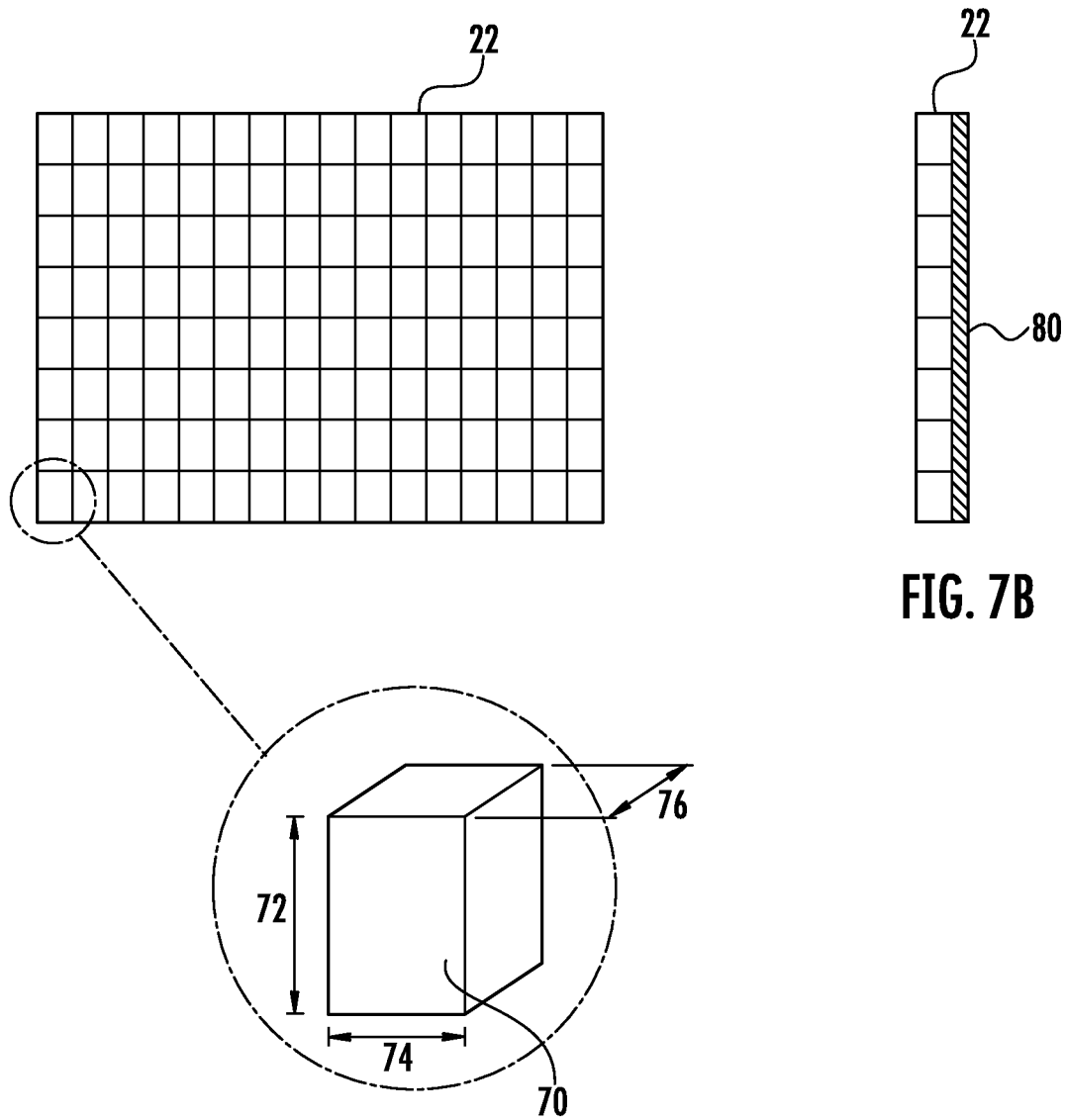
FIGS. 7A-7H illustrate the flood vent of FIGS. 1-2 with a panel having a plurality of insulation pieces and one or more insulation piece connectors.
Figure 7C:
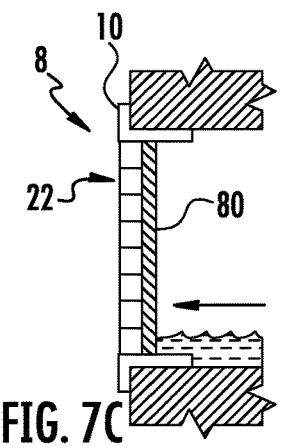
Figure 7D:
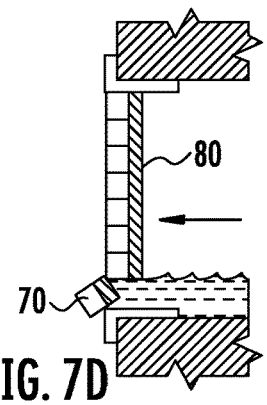
Figure 7E:
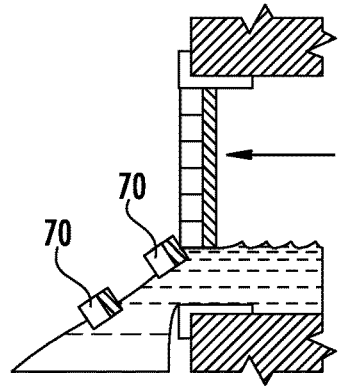
Figure 7F:
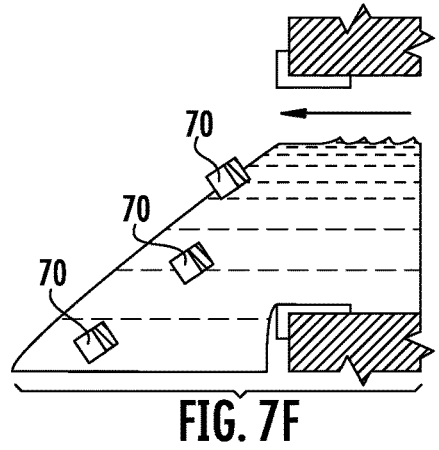

As another example, an insulation piece 70 may have a cross section that is rectangular-shaped, square-shaped (as is illustrated in FIG. 7A), circular-shaped, polygon-shaped, irregular shaped, or any other shape. In particular embodiments, the insulation piece 70 may have a height 72 and length 74 of 0.5" squared, 1.5" squared, 1.5" squared, 2" squared, 2.5" squared, 3" squared, 3.5" squared, or any other height 72 and length 74. In particular embodiments, the insulation piece 70 may have a height 72 and length 74 of approximately 0.5" squared (i.e., 0.5" squared+/−0.1" squared), approximately 1" squared, approximately 1.5" squared, approximately 2" squared, approximately 2.5" squared, approximately 3" squared, approximately 3.5" squared, or approximately any other height 72 and length 74. In particular embodiments, the insulation piece 70 may have a volume (e.g., height 72, length 74, and thickness 76) of 0.5" cubed, 1" cubed, 1.5" cubed, 2" cubed, 2.5" cubed, 3" cubed, 3.5" cubed, or any other volume. In particular embodiments, the insulation piece 70 may have a volume of approximately 0.5" cubed (i.e., 0.5" cubed+/−0.1" cubed), approximately 1" cubed, approximately 1.5" cubed, approximately 2" cubed, approximately 2.5" cubed, approximately 3" cubed, approximately 3.5" cubed, or approximately any other volume. In particular embodiments, the size and/or shape of the insulation piece 70 may assist flood vent 8 in providing for equalization of interior and exterior hydrostatic forces caused by a fluid (such as flooding water) attempting to flow through the flood vent 8. For example, the size and/or shape of the insulation piece 70 may allow the insulation piece 70 to uncouple from the panel 22 and be carried away from the flood vent 8 by the fluid without, for example, the insulation piece 70 becoming stuck in a portion of the flood vent 8, a portion of an adjacent flood vent 8 (e.g., the uncoupled insulation pieces 70 may float underneath an open panel 22 or other door in an adjacent flood vent 8 installed in the same opening 18 in the structure 17), and/or the opening 18 in the structure 17. As such, the flood vent 8, the adjacent flood vent 8, and/or the opening 18 in the structure 17 may not be clogged (or otherwise blocked) by the uncoupled insulation pieces 70, which may allow the flood vent 8 to further provide for equalization of interior and exterior hydrostatic forces caused by a fluid (such as flooding water) attempting to flow through the flood vent 8.

The panel 22 further includes one or more insulation piece connectors 80. An insulation piece connector 80 may include any type of one or more connectors configured to couple the insulation pieces 70 together to form the panel 22, and further configured to uncouple one or more of the insulation pieces 70 from the panel 22 when, for example, a predetermined amount of pressure is applied to the panel 22, such as by a fluid or an object (such as a tree limb or dirt) carried by the fluid. As a first example, an insulation piece connector 80 may be one or more pieces of lamination in contact with the insulation pieces 70. The one or more pieces of lamination may be configured to couple the insulation pieces 70 together to form the panel 22, and may be further configured to uncouple one or more of the insulation pieces 70 from the panel 22 when, for example, a predetermined amount of pressure is applied to the panel 22. The pieces of lamination may include any type of laminate, such as one or more pieces of a plastic film, one or more pieces of a polymer film, any other laminate or film that may couple the insulation pieces 70 together to form the panel 22, or any combination of the preceding. Furthermore, the one or more pieces of lamination may be further configured to uncouple one or more of the insulation pieces 70 from the panel 22 when, for example, a predetermined amount of pressure is applied to the panel 22. For example, the one or more pieces of lamination may be configured to peel off, break, or otherwise uncouple one or more of the insulation pieces 70 from the panel 22 when, for example, a predetermined amount of pressure is applied to the panel 22. In particular embodiments, the one or more pieces of lamination may be engineered and/or modified to peel off, break, or otherwise uncouple one or more of the insulation pieces 70 from the panel 22 when, for example, a predetermined amount of pressure is applied to the panel 22. As one example, the one or more pieces of lamination may include rows of holes (or perforations) that may weaken the one or more pieces of lamination so as to break when a predetermined amount of pressure is applied to the panel 22. In particular embodiments, the amount of material used in the lamination may be selected to cause the one or more pieces of lamination to peel off, break, or otherwise uncouple one or more of the insulation pieces 70 from the panel 22 when, for example, a predetermined amount of pressure is applied to the panel 22.

The pieces of lamination may be laminated to (or otherwise in contact) with each of the insulation pieces 70. For example, the insulation pieces 70 may be arranged together in the shape of the panel 22, and then the one or more pieces of lamination may be laminated to (or otherwise be put in contact with) each of the insulation pieces 70 on the side 24a of the panel 22, thereby coupling the insulation pieces 70 to each other and forming the panel 22. As a further example, the insulation pieces 70 may be arranged together in the shape of the panel 22, and then the one or more pieces of lamination may be laminated to (or otherwise be put in contact with) each of the insulation pieces 70 on the side 24b of the panel 22 (as is illustrated in FIG. 7B), thereby coupling the insulation pieces 70 to each other and forming the panel 22. As another example, the insulation pieces 70 may be arranged together in the shape of the panel 22, and then the one or more pieces of lamination may be laminated to (or otherwise be put in contact with) each of the insulation pieces 70 on both side 24a and side 24b of the panel 22, thereby coupling the insulation pieces 70 to each other and forming the panel 22.

The pieces of lamination may couple the insulation pieces 70 together (thereby forming the panel 22, as is seen in FIG. 7B) until a predetermined amount of pressure is applied to the panel 22 by, for example, a fluid (such as flooding water). Once the predetermined amount of pressure is applied to the panel 22, the pieces of lamination may peel off, break, or otherwise uncouple from the insulation pieces 70 and/or panel 22, thereby uncoupling one or more of the insulation pieces 70 from the panel 22. This may cause one or more of the insulation pieces 70 to be completely separated from the panel 22 (and/or the remaining insulation pieces 70), and be carried away from the flood vent 8, as is illustrated in FIGS. 7C-7F. As such, in particular embodiments, the flood vent 8 may no longer prevent objects and/or fluids from passing through the opening 18 in the structure 17 (or the amount of blockage of the fluid passageway provided by the panel 22 may be reduced).

As a second example, an insulation piece connector 80 may be an adhesive configured to couple the insulation pieces 70 together to form the panel 22, and further configured to uncouple one or more of the insulation pieces 70 from the panel 22 when, for example, a predetermined amount of pressure is applied to the panel 22. The adhesive may include any adhesive substance that may adhere the insulation pieces 70 together to form the panel 22, such as glue, cement, Lexel® adhesive, any other adhesive substance that may adhere the insulation pieces 70 together to form the panel 22, or any combination of the preceding. Furthermore, the adhesive may be further configured to uncouple one or more of the insulation pieces 70 from the panel 22 when, for example, a predetermined amount of pressure is applied to the panel 22. For example, the adhesive may be configured to peel off, break, or otherwise uncouple one or more of the insulation pieces 70 from the panel 22 when, for example, a predetermined amount of pressure is applied to the panel 22. In particular embodiments, the adhesive may be engineered and/or modified to peel off, break, or otherwise uncouple one or more of the insulation pieces 70 from the panel 22 when, for example, a predetermined amount of pressure is applied to the panel 22. In particular embodiments, the amount of adhesive used to couple the insulation pieces 70 together to form the panel 22 may be selected to cause the adhesive to peel off, break, or otherwise uncouple one or more of the insulation pieces 70 from the panel 22 when, for example, a predetermined amount of pressure is applied to the panel 22 and/or the frame 10.

The adhesive may include one or more portions of the adhesive coupled to each of the insulation pieces 70, thereby coupling the insulation pieces 70 to each other and forming the panel 22. The one or more portions of the adhesive may be coupled to any area of the insulation pieces 70, such one or more (or all of the) edges (or sides) of the insulation pieces 70, the side 24a of the panel 22, the side 24b of the panel 22, both the sides 24a and 24b of the panel 22, or any combination of the preceding. The portions of the adhesive may couple the insulation pieces 70 together (thereby forming the panel 22) until a predetermined amount of pressure is applied to the panel 22 by, for example, a fluid (such as flooding water). Once the predetermined amount of pressure is applied to the panel 22, the adhesive may peel off, break, or otherwise uncouple one or more of the insulation pieces 70 from the panel 22. This may cause one or more of the insulation pieces 70 to be completely separated from the panel 22 (and/or the remaining insulation pieces 70), and be carried away from the flood vent 8. As such, in particular embodiments, the flood vent 8 may no longer prevent objects and/or fluids from passing through the opening 18 in the structure 17 (or the amount of blockage of the fluid passageway provided by the panel 22 may be reduced).

As a third example, an insulation piece connector 80 may be one or more mechanical fasteners configured to couple the insulation pieces 70 together to form the panel 22, and further configured to uncouple one or more of the insulation pieces 70 from the panel 22 when, for example, a predetermined amount of pressure is applied to the panel 22. The mechanical fasteners may include any one or more devices and/or objects that may mechanically fasten the insulation pieces 70 together, such as one or more nails, screws, rivets, nuts and bolts, rods and studs, anchors, pins, retaining rings and/or clips, any other devices and/or objects that may mechanically fasten the insulation pieces 70 together, or any combination of the preceding. Furthermore, the mechanical fasteners may be configured to uncouple one or more of the insulation pieces 70 from the panel 22 when, for example, a predetermined amount of pressure is applied to the panel 22. For example, the mechanical fasteners may be configured to break or otherwise uncouple one or more of the insulation pieces 70 from the panel 22 when, for example, a predetermined amount of pressure is applied to the panel 22. In particular embodiments, the mechanical fasteners may be engineered and/or modified to break or otherwise uncouple one or more of the insulation pieces 70 from the panel 22 when, for example, a predetermined amount of pressure is applied to the panel 22.

The mechanical fasteners may include one or more mechanical fasteners coupled to each of the insulation pieces 70, thereby coupling the insulation pieces 70 to each other and forming the panel 22. The mechanical fasteners may be coupled to any area of the insulation pieces 70, such one or more (or all of the) edges (or sides) of the insulation pieces 70, the side 24a of the panel 22, the side 24b of the panel 22, both the sides 24a and 24b of the panel 22, or any combination of the preceding. The mechanical fasteners may couple the insulation pieces 70 together (thereby forming the panel 22) until a predetermined amount of pressure is applied to the panel 22 by, for example, a fluid (such as flooding water). Once the predetermined amount of pressure is applied to the panel 22, the mechanical fasteners may break or otherwise uncouple one or more of the insulation pieces 70 from the panel 22. This may cause one or more of the insulation pieces 70 to be completely separated from the panel 22 (and/or the remaining insulation pieces 70), and be carried away from the flood vent 8. As such, in particular embodiments, the flood vent 8 may no longer prevent objects and/or fluids from passing through the opening 18 in the structure 17 (or the amount of blockage of the fluid passageway provided by the panel 22 may be reduced).

Figure 7G:
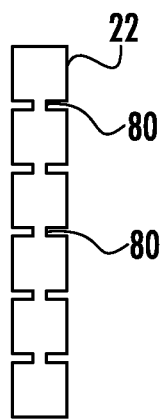

As a fourth example, an insulation piece connector 80 may be one or more integral connectors configured to couple the insulation pieces 70 together to form the panel 22, and further configured to uncouple one or more of the insulation pieces 70 from the panel 22 when, for example, a predetermined amount of pressure is applied to the panel 22. The integral connectors may be portions of the insulation pieces 70, themselves, that couple the insulation pieces 70 together. For example, the insulation pieces 70 may be formed or otherwise manufactured in the form of the panel 22, with connector segments integrally formed in (or on) the insulation pieces 70 so as to protrude from the insulation pieces 70 and attach the insulation pieces 70 together (as is illustrated in FIG. 7G). As another example, the panel 22 may be formed as a single solid piece, and the insulation pieces 70 and integral connectors may be formed from the solid piece (such as by stamping the solid piece, cutting-out portions of the solid piece, or any other means of removing material). As an example of this, a steel rule die (e.g., a steel rule die having one or more divots in the blade) may be used to stamp the solid-piece (such as a solid-piece of polyethylene foam), for example. Such stamping may cut through almost the entire thickness (or other dimension) of the panel 22 in order to form the individual insulation pieces 70 in the panel 22, but may leave one or more un-cut connections or strands (e.g., hair-like strands) in-between each of the individual insulation pieces 70. These un-cut connections or strands may be the integral connectors configured to couple the insulation pieces 70 together to form the panel 22. Furthermore, the integral connectors may be configured to uncouple one or more of the insulation pieces 70 from the panel 22 when, for example, a predetermined amount of pressure is applied to the panel 22. For example, the integral connectors may be configured to break or otherwise uncouple one or more of the insulation pieces 70 from the panel 22 when, for example, a predetermined amount of pressure is applied to the panel 22. In particular embodiments, the integral connectors may be sized (e.g., by the one or more divots in the blade of the steel rule die, for example) (or otherwise modified) to break or otherwise uncouple one or more of the insulation pieces 70 from the panel 22 when, for example, a predetermined amount of pressure is applied to the panel 22.

The integral connectors may include one or more integral connectors coupled to (or formed in) each of the insulation pieces 70, thereby coupling the insulation pieces 70 to each other and forming the panel 22. The integral connectors may be coupled to (or formed in) any area of the insulation pieces, such one or more (or all of the) edges (or sides) of the insulation pieces 70, the side 24a of the panel 22, the side 24b of the panel 22, both the sides 24a and 24b of the panel 22, or any combination of the preceding. The integral connectors may couple the insulation pieces 70 together (thereby forming the panel 22) until a predetermined amount of pressure is applied to the panel 22 by, for example, a fluid (such as flooding water). Once the predetermined amount of pressure is applied to the panel 22, the integral connectors may break or otherwise uncouple one or more of the insulation pieces 70 from the panel 22. This may cause one or more of the insulation pieces 70 to be completely separated from the panel 22 (and/or the remaining insulation pieces 70), and be carried away from the flood vent 8. As such, in particular embodiments, the flood vent 8 may no longer prevent objects and/or fluids from passing through the opening 18 in the structure 17 (or the amount of blockage of the fluid passageway provided by the panel 22 may be reduced).

The flood vent 8 may include any number of insulation piece connectors 80. For example, the flood vent 8 may include one insulation piece connector 80, two insulation piece connectors 80, three insulation piece connectors 80, four insulation piece connectors 80, six insulation piece connectors 80, eight insulation piece connectors 80, ten insulation piece connectors 80, twenty insulation piece connectors 80, fifty insulation piece connectors 80, 64 insulation piece connectors 80, 100 insulation piece connectors 80, 128 insulation piece connectors 80, 256 insulation piece connectors 80, one insulation piece connector 80 for each insulation piece 70, two insulation piece connectors 80 for each insulation piece 70, or any other number of insulation piece connectors 80. The insulation piece connectors 80 may have any size and/or shape that may allow the insulation piece connectors 80 to uncouple one or more of the insulation pieces 70 from the panel 22 when a predetermined amount of pressure is applied to the panel 22.

As is discussed above, the insulation piece connectors 80 may be configured to uncouple one or more of the insulation pieces 70 from the panel 22 when, for example, a predetermined amount of pressure is applied to the panel 22. In particular embodiments, the predetermined amount of pressure may refer to the lowest amount of pressure (or approximately the lowest amount of pressure) that would cause the panel 22 to prevent the equalization of interior and exterior hydrostatic forces caused by a fluid (such as flooding water) attempting to flow through the flood vent 8. As an example, the predetermined amount of pressure may be 0.5 PSI, 1 PSI, 1.5 PSI, 2 PSI, 2.5 PSI, 3 PSI, 3.5 PSI, 4 PSI, 4.5 PSI, 5 PSI, 6 PSI, 7 PSI, 10 PSI, approximately 0.5 PSI (i.e., 0.5 PSI+/−0.2 PSI), approximately 1 PSI, approximately 1.5 PSI, approximately 2 PSI, approximately 2.5 PSI, approximately 3 PSI, approximately 3.5 PSI, approximately 4 PSI, approximately 4.5 PSI, approximately 5 PSI, approximately 6 PSI, approximately 7 PSI, approximately 10 PSI, or any other amount of pressure that may prevent the equalization of interior and exterior hydrostatic forces caused by a fluid (such as flooding water) attempting to flow through the flood vent 8. As a further example, the predetermined amount of pressure may be a pressure range of 0.5 PSI-7 PSI, 0.5-5.0

PSI, 0.5-4.0 PSI, 0.5-3.0 PSI, 1.0-7.0 PSI, 1.0-5.0 PSI, 1.0-4.0 PSI, 1.0-3.0 PSI, 1.5-7.0 PSI, 1.5-5.0 PSI, 1.5-4.0 PSI, 1.5-3.0 PSI, 2.0-7.0 PSI, 2.0-5.0 PSI, 2.0-4.0 PSI, 2.0-3.0 PSI, or any other pressure range that may prevent the equalization of interior and exterior hydrostatic forces caused by a fluid (such as flooding water) attempting to flow through the flood vent 8.

In particular embodiments, the predetermined amount of pressure may be the lowest pressure at which the insulation piece connectors 80 may be configured to uncouple one or more of the insulation pieces 70 from the panel 22. For example, if an amount of pressure below the predetermined amount of pressure is applied to the panel 22, the insulation piece connectors 80 may not uncouple one or more of the insulation pieces 70 from the panel 22. On the other hand, if an amount of pressure equal to the predetermined amount of pressure (or above the predetermined amount of pressure) is applied to the panel 22, the insulation piece connectors 80 may uncouple one or more of the insulation pieces 70 from the panel 22.

In particular embodiments, the insulation piece connectors 80 may be configured to uncouple one or more of the insulation pieces 70 from the panel 22 if the predetermined amount of pressure is applied to any portion of the panel 22. For example, the insulation piece connectors 80 may be configured to uncouple one or more of the insulation pieces 70 from the panel 22 if the predetermined amount of pressure is applied to a bottom portion of the panel 22, a top portion of the panel 22, a left and/or right side portion of the panel 22, any other portion of the panel 22, or any combination of the preceding. Furthermore, the one or more insulation pieces 70 uncoupled from the panel 22 may be associated with the portion of the panel 22 to which the predetermined amount of pressure is applied. For example, if the predetermined amount of pressure is applied to a bottom portion of the panel 22, the one or more insulation pieces 70 uncoupled from the panel 22 may be insulation pieces 70 that were located in (and/or near) the bottom portion of the panel 22. Furthermore, in such an example, the insulation pieces 70 not located in (and/or near) the bottom portion of the panel 22 may not be uncoupled from the panel 22. Instead, the insulation pieces 70 not located in (and/or near) the bottom portion of the panel 22 may remain coupled to the panel 22 (and/or the remaining insulation pieces 70 in the panel 22) until the predetermined amount of pressure is applied to the portion of the panel 22 in which those insulation pieces 70 are located (and/or near where those insulation pieces 70 are located). Alternatively, in particular embodiments, once one or more insulation pieces 70 are uncoupled from the panel 22, the uncoupling may create a cascading effect that may uncouple all or a substantial portion (i.e., 90% of the insulation pieces 70) from the panel 22.

In particular embodiments, the predetermined amount of pressure for causing the insulation piece connectors 80 to uncouple one or more of the insulation pieces 70 from the panel 22 may change based on (or be a function of) the portion of the panel 22 to which the predetermined amount of pressure is applied. For example, the predetermined amount of pressure may be greater if the predetermined amount of pressure is applied to the bottom portion of the panel 22 (which may be indicative of a less amount of flooding fluids, for example) than if the predetermined amount of pressure is applied to the top portion of the panel 22 (which may be indicative of a greater amount of flooding fluids, for example). In particular embodiments, the predetermined amount of pressure for causing the insulation piece connectors 80 to uncouple one or more of the insulation pieces 70 from the panel 22 may change based on (or be a function of) the type of panel 22 included in the flood vent 8. For example, the predetermined amount of pressure may be less if the panel 22 is a panel without any openings 26 (or with openings that may be closed, using louvers, for example) than if the panel includes openings 26 that may not be closed. In such an example, a panel 22 without openings 26 (when compared to a panel 22 with openings 26) may more easily (or quickly) prevent equalization of interior and exterior hydrostatic forces caused by a fluid, and therefore it may be advantageous to uncouple the panel 22 without openings 26 at a lower amount of pressure (when compared to a panel 22 with openings 26). As another example, the predetermined amount of pressure may be less if the panel 22 is a panel 22 with less openings 26 (and/or with smaller openings 26) than if the panel 22 includes more openings 26 (and/or has bigger openings 26). In such an example, a panel 22 with less openings 26 (when compared to a panel 22 with more openings 26) may more easily (or quickly) prevent equalization of interior and exterior hydrostatic forces caused by a fluid, and therefore it may be advantageous to uncouple the panel 22 with less openings 26 at a lower amount of pressure (when compared to a panel 22 with more openings 26).

In particular embodiments, the insulation piece connectors 80 may be configured to uncouple the one or more of the insulation pieces 70 from the panel 22 if the predetermined amount of pressure is applied to any side of the panel 22. For example, the insulation piece connectors 80 may be configured to uncouple one or more of the insulation pieces 70 from the panel 22 if the predetermined amount of pressure is applied to side 24b of the panel 22 (e.g., the side of the panel 22 facing the interior of the structure 17), thereby causing the one or more insulation pieces 70 to be uncoupled from the flood vent 8 and be carried by the fluids, for example, outside of the structure 17, as is illustrated in FIGS. 7C-7F. In particular embodiments, this may cause the one or more insulation pieces 70 to be uncoupled from the flood vent 8 when flooding fluids, for example, enter the flood vent 8 from inside the structure 17. As another example, the insulation piece connectors 80 may be configured to uncouple one or more of the insulation pieces 70 from the panel 22 if the predetermined amount of pressure is applied to side 24a the panel 22 (e.g., the side of the panel 22 facing the exterior of the structure 17), thereby causing the one or more insulation pieces 22 to be uncoupled from the flood vent 8 and be carried by the fluids, for example, inside of the structure 17 (e.g., in a direction from left-to-right in FIGS. 7C-7F). In particular embodiments, this may cause the one or more insulation pieces 70 to be uncoupled from the flood vent 8 when flooding fluids, for example, enter the flood vent 8 from outside the structure 17. As a further example, the insulation piece connectors 80 may be configured to uncouple one or more of the insulation pieces 70 from the panel 22 if the predetermined amount of pressure is applied to either the side 24b of the panel 22 (e.g., the side of the panel 22 facing the interior of the structure 17) or the side 24a of the panel 22 (e.g., the side of the panel 22 facing the exterior of the structure 17). In particular embodiments, this may cause the one or more insulation pieces 70 to be uncoupled from the flood vent 8 when flooding fluids, for example, enter the flood vent 8 from either inside the structure 17 or outside the structure 17.

Figure 7H:
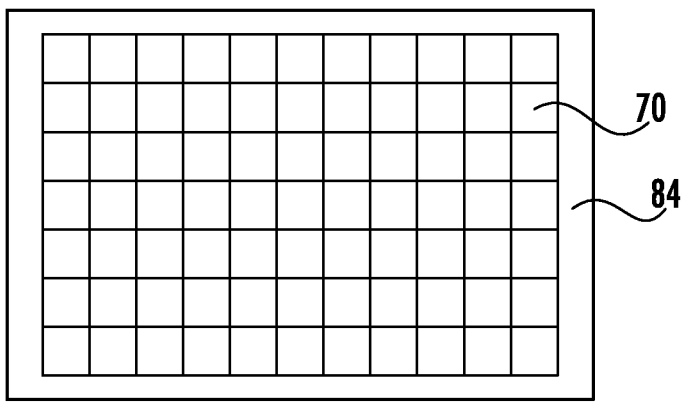

The panel 22 may further have a frame 84, as is illustrated in FIG. 7H. The frame 84 may be a portion of the panel 22 that surrounds the insulation pieces 70 and the insulation piece connectors 80. In particular embodiments, the frame 84 may be a portion of the panel 22 that does not uncouple from the panel 22. For example, although the insulation pieces 70 may be uncoupled from the panel 22, the frame 84 may remain a portion of the panel 22. In such an example, the insulation pieces 70 may uncouple from the frame 84 (and the panel 22) when the predetermined amount of the pressure is applied to the insulation pieces 70. In particular embodiments, all of the insulation pieces 70 may be uncoupled from the frame 84 of the panel 22, leaving an opening in the panel 22 having the shape of the frame 84. Insulation pieces 70 may be coupled to the frame 84 by one or more insulation piece connectors 80.

The frame 84 may have any size and/or shape. For example, the frame 84 may have an edge sizing 88 of 0.15", 0.25", 0.375", 0.50", 1.0" 1.50", 2.0", 3.0" 4.0", or any other edge sizing 88. As another example, the frame 84 may be rectangular-shaped (as is illustrated in FIG. 7H), square-shaped, circular-shaped, polygon-shaped, irregular shaped, or any other shape. The frame 84 may be formed from (or include) any type of material configured to at least partially prevent fluids (such as water and/or air) from passing through the frame 84. For example, frame 84 may be formed from (or include) rubber, plastic, a polymer, a foam, a metal (such as aluminum, stainless steel, spring steel, a galvanized material, any other metal, or any combination of the preceding), any other insulating material, any other material configured to at least partially prevent fluids (such as water and/or air) from passing through frame 84, or any combination of the preceding. In particular embodiments, frame 84 may be formed from (or include) a foam insulation, such as polyurethane, polyisocyanurate, polystyrene, polyethylene (such as cross linked polyethylene), icynene, air krete, teflon (PTFE), polyester, synthetic rubber, any other foam insulation, or any combination of the preceding. In particular embodiments, frame 84 may be formed from (or include) a rubber or polymer, such as butyl, natural rubber, nitrile, ethylene propylene, polyurethane, silicone, any other rubber or polymer, or any combination of the preceding. In particular embodiments, frame 84 may be formed for the same material as insulation pieces 70, or may be formed from a different material. In particular embodiments, the frame 84 may be formed simultaneously (or substantially simultaneously) with the insulation pieces 70 and insulation piece connectors 80. For example, the panel 22 may be formed as a single solid piece, and the frame 84, the insulation pieces 70, and the insulation piece connectors 80 may be formed from the solid piece (such as by stamping the solid piece, cutting-out portions of the solid piece, or any other means of removing material). As an example of this, a steel rule die (e.g., a steel rule die having one or more divots in the blade) may be used to stamp the solid-piece (such as a solid-piece of polyethylene foam), for example. Such stamping may cut through almost the entire thickness (or other dimension) of the panel 22 in order to form the frame 84 and the individual insulation pieces 70 in the panel 22, but may leave one or more un-cut connections or strands (e.g., hair-like strands) in-between each of the individual insulation pieces 70 and the frame 84. These un-cut connections or strands may be the insulation piece connectors 80 configured to couple the insulation pieces 70 together to form the panel 22.

Modifications, additions, or omissions may be made to the flood vent 8 of FIGS. 7A-7G without departing from the scope of the disclosure. For example, the flood vent 8 of FIGS. 7A-7G may include one or more components of the flood vent 8 of FIGS. 4A-4C. In such an example, the flood vent 8 may include a panel 22 having a plurality of insulation pieces 70 and one or more insulation piece connectors 80 configured to couple the insulation pieces 70 together (thereby forming panel 22), and further configured to uncouple one or more of the insulation pieces 70 from the panel 22 when a first predetermined amount of pressure is applied to the panel 22, and may further include one or more connectors 40 that may be configured to uncouple the frame 10 from the structure 17 when a second predetermined amount of pressure is applied to the panel 22 and/or the frame 10. The first predetermined amount of pressure (which may uncouple one or more of the insulation pieces 70 from the panel 22) may be less than the second predetermined amount of pressure (which may uncouple the frame 10 from the structure 17). For example, the first predetermined amount of pressure may be a pressure range of 0.5 PSI-7 PSI (or any of the pressures or pressure ranges discussed above) while the second predetermined amount of pressure may be a pressure range of 1.5 PSI-8 PSI (or any of the pressures or pressure ranges discussed above and further being greater than the first predetermined amount of pressure). As such, if a fluid (such as flooding water) applies a first predetermined amount of pressure to the panel 22, one or more insulation pieces 70 may be uncoupled from the panel 22 (which may reduce the amount of blockage of the fluid passageway by the panel 22). Furthermore, in an example where the fluid (such as the flooding water) continues to rise and apply additional force, if the fluid applies the second predetermined amount of pressure to the frame 10, the frame 10 may be uncoupled from the structure 17 (which may further reduce the amount of blockage of the fluid). As such, the flood vent 8 may be able to further provide for equalization of interior and exterior hydrostatic forces caused by flooding waters.

As another example, although the flood vent 8 has been described above as including a frame 10, in particular embodiments, the flood vent 8 may not include a frame 10. In such embodiments, the panel 22 may be configured to be coupled directly to the structure 17. As such, in particular embodiments, the panel 22 may be inserted into (or installed on) the structure 17 (such as the opening 18 in the structure 17) without the use of a frame 10.

Modifications, additions, or omissions may be made to the flood vents 8 of FIGS. 1-7 without departing from the scope of the disclosure. For example, the panel 22 may be replaceable without, for example, replacing the entire flood vent 8. In particular, after all or a portion of the panel 22 has been uncoupled from the flood vent 8 (as a result of a predetermined amount of pressure being applied to the panel 22, for example), the panel 22 may be replaced by a new panel 22 (with the same features and capabilities discussed above with regard to FIGS. 1-7) that may be re-welded to the frame 10, re-coupled to the frame 10 using an adhesive (such as glue, cement, and/or Lexel®), re-attached to the frame 10 using one or more pins that may be inserted or snapped into one or more channels or hooks in the frame 10, re-attached to the frame 10 using one or more rivets, nails, and/or any other connector, re-attached to the structure 17 (and thus the frame 10) using one or more rivets, nails, and/or any other connect, re-coupled to the frame 10 in any other manner, or any combination of the preceding. As such, the flood vent 8 may continue to operate, without replacing the entire flood vent 8. As another example, the disclosure of each of FIGS. 1-7 may be combined with one or more (or all) of any of the other disclosures of FIGS. 1-7. As one example of this, an opening 18 in a structure 17 may have a first flood vent (such as a flood vent 8 of FIGS. 7A-7H) installed on a first side of the structure 17 (such as the interior side of the structure 17)

and may further have a second flood vent (such as a flood vent 8 of any of FIGS. 1-6, or any other flood vent, such as any flood vent included in U.S. Pat. No. 6,692,187 entitled "Flood Gate For Door") installed on a second side of the structure 17 (such as the exterior side of the structure 17).

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

The invention claimed is:

1. A flood vent, comprising:
    a frame made from plastic and/or metal, the frame configured to be coupled to an exterior side or an interior side of a structure, the frame comprising:
        a first set of one or more raised bumps;
        a second set of one or more raised bumps positioned rearward of the first set of one or more raised bumps;
        a gap positioned in-between the first set of one or more raised bumps and the second set of one or more raised bumps; and
    a panel made from plastic and/or metal, the panel configured to be coupled to the frame so as to at least partially block a fluid passageway through an opening in the structure;
    wherein the first set of one or more raised bumps and the second set of one or more raised bumps are configured to couple the panel to the frame by retaining the panel within the gap positioned in-between the first set of one or more raised bumps and the second set of one or more raised bumps, wherein at least the first set of one or more raised bumps or the second set of one or more raised bumps are further configured to uncouple the panel from the frame so as to completely separate the panel from the frame when a predetermined amount of pressure is applied to a portion of the panel on a first side of the panel by a fluid and/or an object carried by the fluid.

2. The flood vent of claim 1, wherein the panel has one or more openings configured to allow fluids to pass through the panel.

3. The flood vent of claim 1, wherein the panel has one or more louvers.

4. The flood vent of claim 3, wherein the one or more louvers are configured to open and close.

5. The flood vent of claim 2, wherein the panel further has a screen.

6. The flood vent of claim 1, wherein at least a portion of the frame is configured to extend within the opening in the structure.

7. The flood vent of claim 1, wherein the predetermined amount of pressure comprises an amount of pressure that causes the panel to prevent equalization of interior and exterior hydrostatic forces caused by the fluid and/or the object carried by the fluid.

8. The flood vent of claim 1, wherein the predetermined amount of pressure comprises an amount of pressure provided by flooding waters.

9. The flood vent of claim 1, further comprising one or more connectors configured to couple the frame to the exterior side or the interior side of the structure, the one or more connectors comprising one or more screws and/or an adhesive.

10. The flood vent of claim 1, wherein at least the first set of one or more raised bumps or the second set of one or more raised bumps are further configured to uncouple the panel from the frame so as to completely separate the panel from the frame when a predetermined amount of pressure is applied to a portion of the panel on a second side of the panel opposite of the first side of the panel by a fluid and/or an object carried by the fluid.

11. The flood vent of claim 1, wherein:
    the first set of one or more raised bumps comprises:
        at least a first raised bump positioned on and extending downward from a top interior edge of the frame; and
        at least a second raised bump positioned on and extending upward from a bottom interior edge of the frame; and
    the second set of one or more raised bumps comprises:
        at least a third raised bump positioned on and extending downward from the top interior edge of the frame; and
        at least a fourth raised bump positioned on and extending upward from the bottom interior edge of the frame.

* * * * *